(12) United States Patent
You et al.

(10) Patent No.: US 11,635,588 B2
(45) Date of Patent: Apr. 25, 2023

(54) OPTICAL IMAGING LENS ASSEMBLY

(71) Applicant: Zhejiang Sunny Optical Co., Ltd., Ningbo (CN)

(72) Inventors: Xinghai You, Ningbo (CN); Kaiyuan Zhang, Ningbo (CN); Lin Huang, Ningbo (CN); Liefeng Zhao, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 393 days.

(21) Appl. No.: 16/854,388

(22) Filed: Apr. 21, 2020

(65) Prior Publication Data
US 2020/0249442 A1 Aug. 6, 2020

Related U.S. Application Data

(63) Continuation of application No. PCT/CN2018/117168, filed on Nov. 23, 2018.

(30) Foreign Application Priority Data

Jun. 1, 2018 (CN) .......................... 201810555994.1

(51) Int. Cl.
G02B 13/00 (2006.01)
G02B 9/62 (2006.01)

(52) U.S. Cl.
CPC ............ G02B 13/0045 (2013.01); G02B 9/62 (2013.01)

(58) Field of Classification Search
CPC ........ G02B 9/62; G02B 9/64; G02B 13/0045; G02B 27/0025; H04N 5/222; H04N 5/2254

(Continued)

(56) References Cited

U.S. PATENT DOCUMENTS 8,643,357 B2 2/2014 Chen et al.
9,063,320 B2 6/2015 Lee et al.
(Continued)

FOREIGN PATENT DOCUMENTS

CN 103913824 A 7/2014
CN 104570284 A 4/2015
(Continued)

OTHER PUBLICATIONS

Notification to Grant Patent Right for Invention; Chinese Patent Application No. 202110701636.9; dated May 11, 2022.
(Continued)

Primary Examiner — Travis S Fissel
(74) Attorney, Agent, or Firm — Barnes & Thornburg LLP

(57) ABSTRACT

The application discloses an optical imaging lens assembly including, sequentially from an object side to an image side, a first lens having a positive refractive power with a convex object side surface and a concave image side surface; a second lens having a negative refractive power with a convex object side surface and a concave image side surface; a third lens having a refractive power; a fourth lens having a refractive power with a concave image side surface; a fifth lens having a refractive power; a sixth lens having a negative refractive power with a convex object side surface and a concave image side surface. An effective focal length f, an entrance pupil diameter EPD, half of a maximum field of view HFOV and a curvature radius R8 of the image side surface of the fourth lens satisfy f/EPD<2.0, 3.8 mm<f*TAN(HFOV)<5 mm, and R8≥500 mm.

17 Claims, 9 Drawing Sheets

(58) Field of Classification Search
USPC ......... 359/656–658, 708, 713, 749, 756–762
See application file for complete search history.

(56) References Cited

U.S. PATENT DOCUMENTS

| | | | |
|---|---|---|---|
| 9,291,797 | B2 | 3/2016 | Son |
| 9,664,881 | B2 | 5/2017 | Koreeda |
| 9,958,646 | B2 | 5/2018 | Lai et al. |
| 10,025,074 | B2 | 7/2018 | Katsuragi et al. |
| 10,031,318 | B2 | 7/2018 | Chen et al. |
| 10,139,596 | B2 | 11/2018 | Gong et al. |
| 10,156,702 | B2 | 12/2018 | Hsueh et al. |
| 2015/0138425 | A1 | 5/2015 | Lee et al. |
| 2016/0195702 | A1* | 7/2016 | Lee ................ G02B 9/62 359/713 |
| 2019/0265438 | A1* | 8/2019 | Sekine ............. G02B 9/62 |
| 2020/0057249 | A1 | 2/2020 | Zhang et al. |

FOREIGN PATENT DOCUMENTS

| | | |
|---|---|---|
| CN | 104570294 A | 4/2015 |
| CN | 103257430 | 6/2015 |
| CN | 105242374 A | 1/2016 |
| CN | 205353448 U | 6/2016 |
| CN | 105807391 A | 7/2016 |
| CN | 106338815 | 1/2017 |
| CN | 106556919 A | 4/2017 |
| CN | 106646833 A | 5/2017 |
| CN | 106772931 A | 5/2017 |
| CN | 107045179 A | 8/2017 |
| CN | 107092082 A | 8/2017 |
| CN | 107132638 A | 9/2017 |
| CN | 107436477 A | 12/2017 |
| CN | 107703605 A | 2/2018 |
| CN | 107783261 A | 3/2018 |
| CN | 107843977 A | 3/2018 |
| CN | 207164346 U | 3/2018 |
| CN | 107966794 A | 4/2018 |
| CN | 108681034 A | 10/2018 |
| CN | 208421380 U | 1/2019 |
| JP | 2014232147 A | 12/2014 |
| JP | 2016090777 A | 5/2016 |
| JP | 2016114633 A | 6/2016 |

OTHER PUBLICATIONS

First Office Action; Chinese Patent Application No. 202110701636.9; dated Mar. 1, 2022.
First Office Action; Chinese Patent Application No. 202110701638.8; dated Jun. 7, 2022.

* cited by examiner

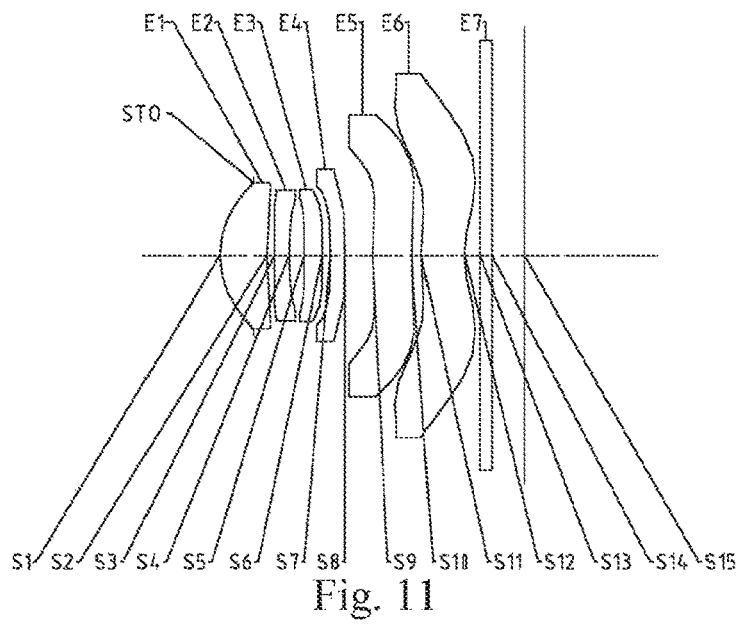
Fig. 11
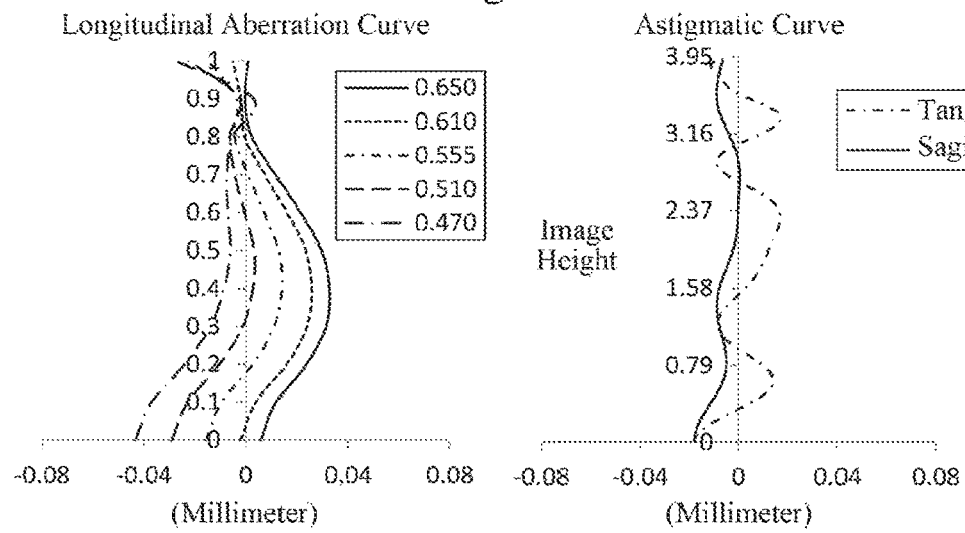
Fig. 12
Fig. 13
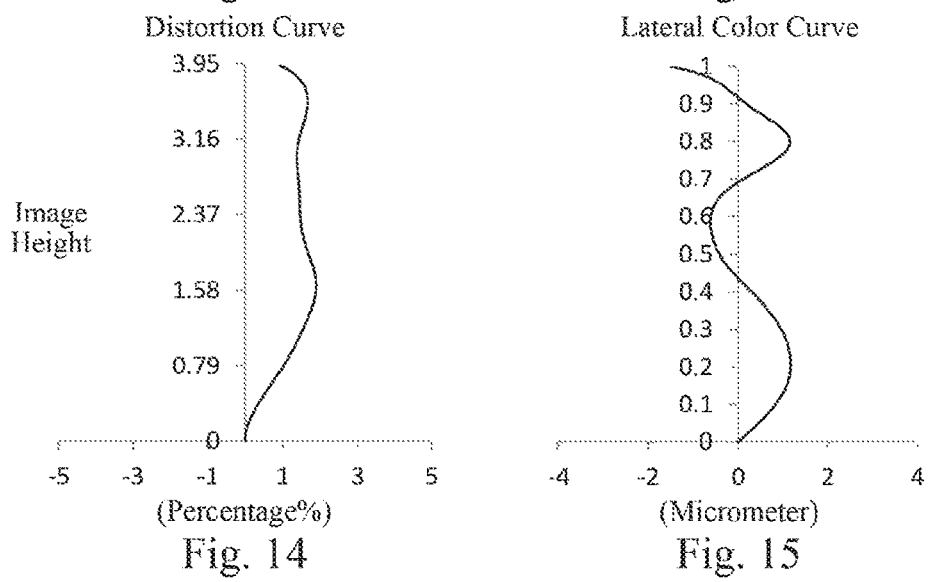
Fig. 14
Fig. 15

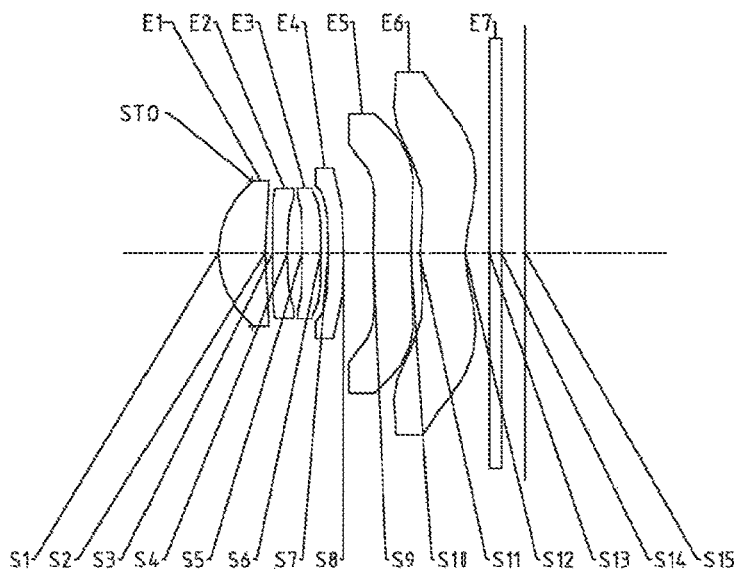
Fig. 16
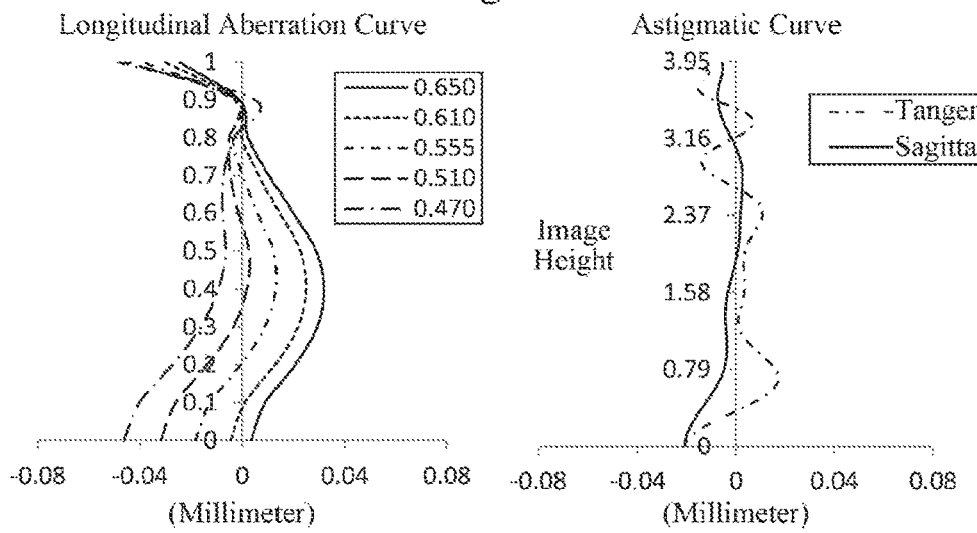
Fig. 17  Fig. 18
Fig. 19  Fig. 20

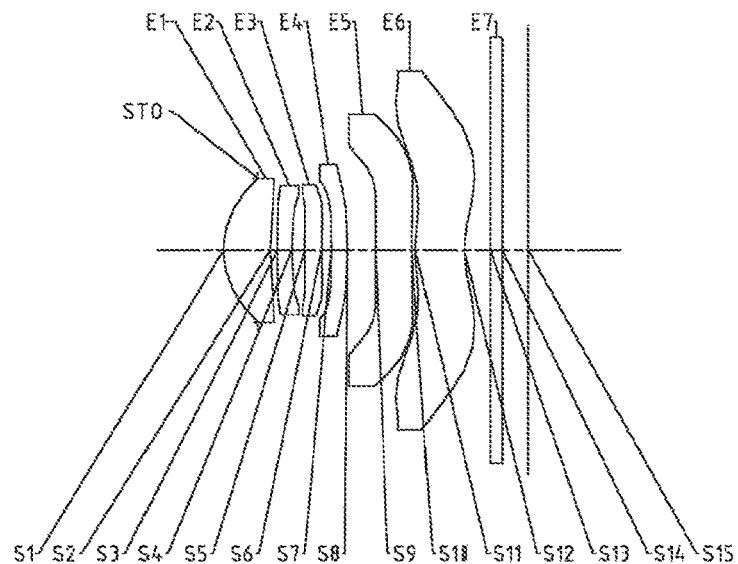
Fig. 21
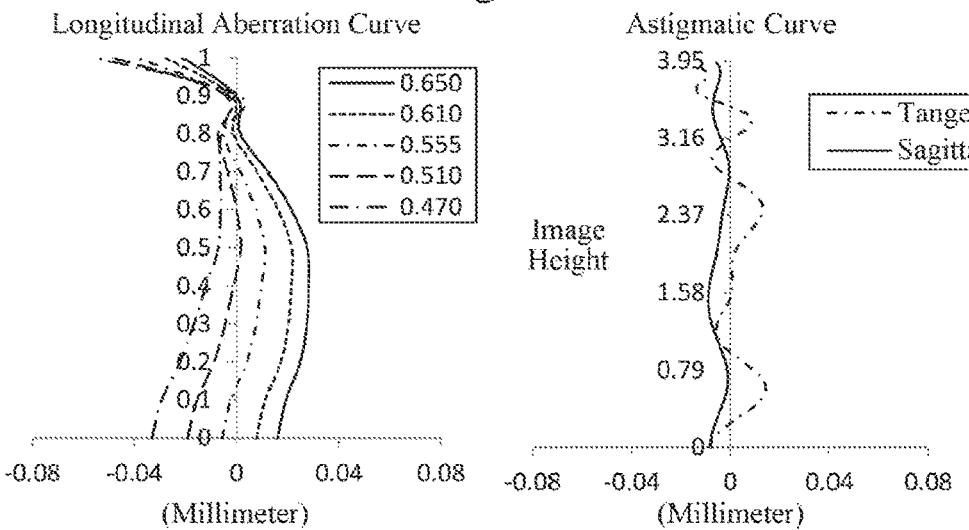
Fig. 22
Fig. 23
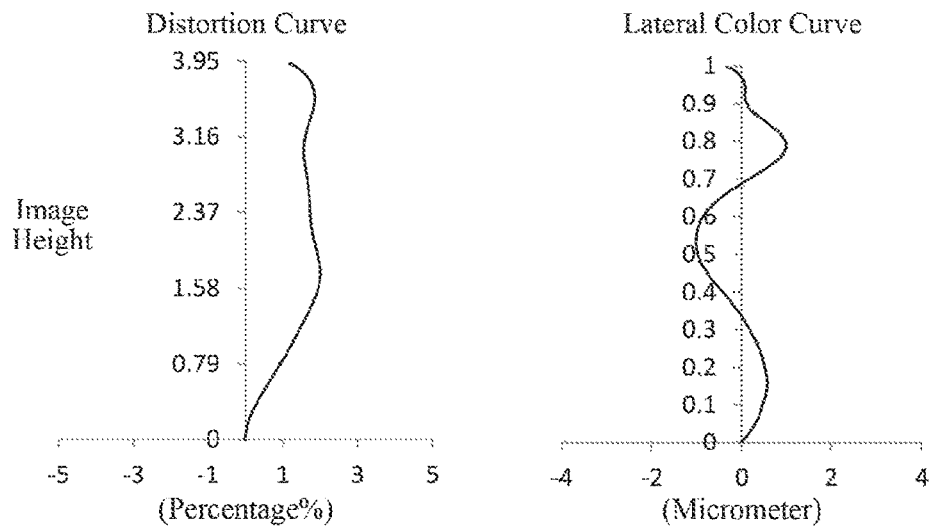
Fig. 24
Fig. 25

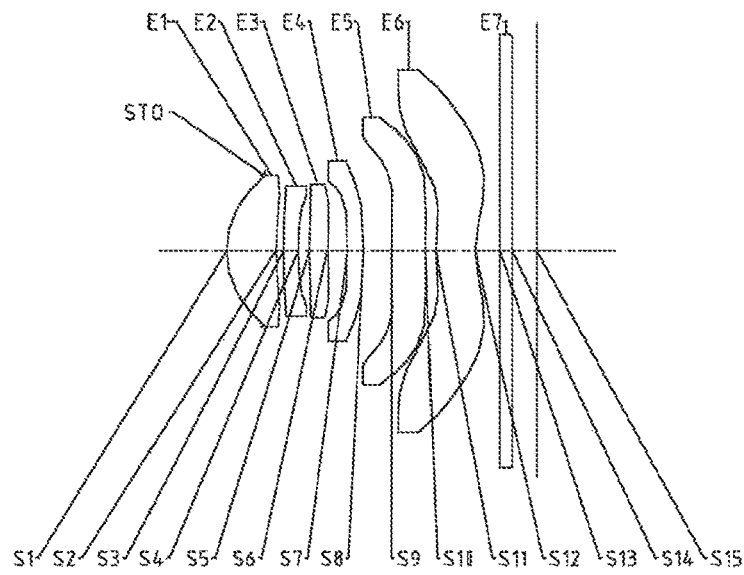
Fig. 41
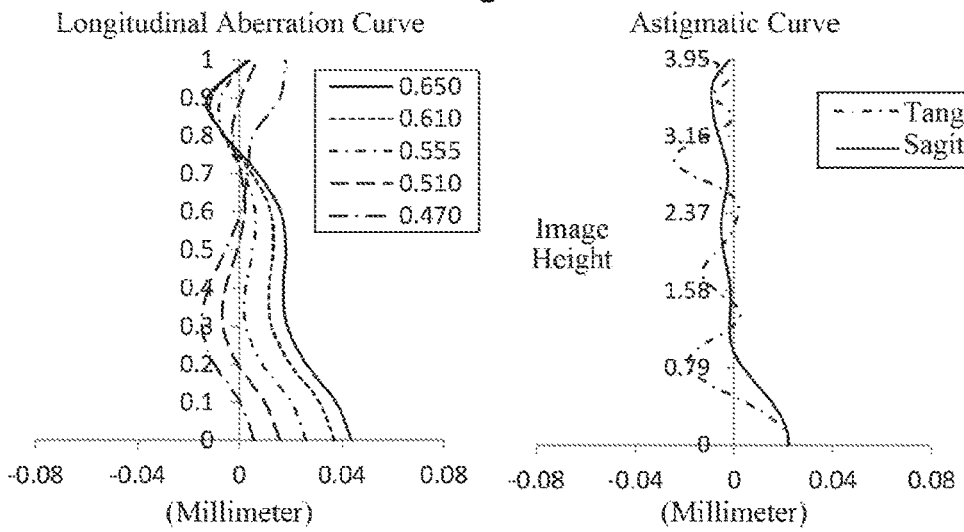
Fig. 42
Fig. 43
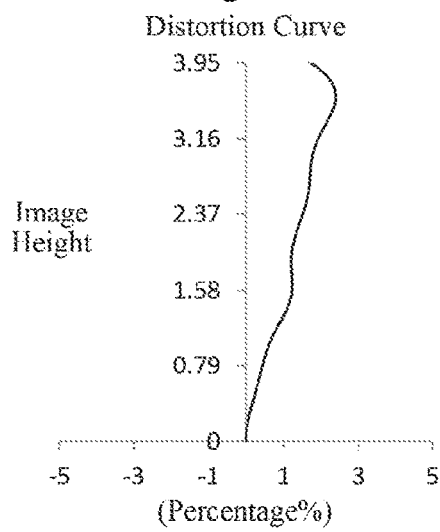
Fig. 44
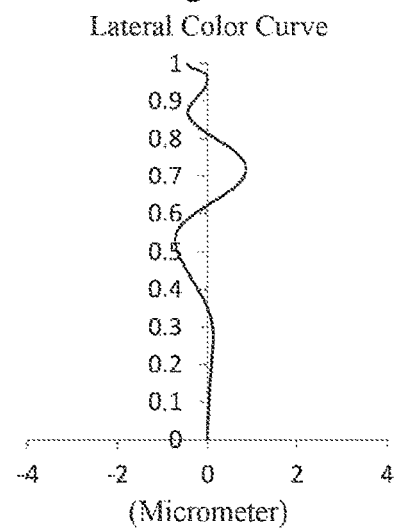
Fig. 45

OPTICAL IMAGING LENS ASSEMBLY

CROSS-REFERENCE TO RELATED APPLICATIONS

The present patent application is a continuation of International Application No. PCT/CN2018/117168, filed on Nov. 23, 2018, which claims priority from Chinese Patent Application No. 201810555994.1, filed on Jun. 1, 2018 before the China National Intellectual Property Administration. Both of the aforementioned patent applications are hereby incorporated by reference in their entireties.

TECHNICAL FIELD

The disclosure relates to an optical imaging lens assembly, and in particular to an optical imaging lens assembly consisting of six lenses.

BACKGROUND

In recent years, with the development of social economy and the progress of science and technology, the thickness of portable electronic products such as mobile phones and tablet computers is becoming thinner and thinner. On the other hand, with the improvement of the performance and the decrease of the size of the CCD and the CMOS image sensor, the corresponding imaging lens assembly needs to meet the requirements of high imaging quality. The imaging lens assembly with a large aperture and a high resolution has been developed to ensure a clear imaging effect under the condition of lack of light (such as, in rainy day and at dusk) and to achieve the miniaturization of the lens.

An optical system with an ultra-thin appearance, a large aperture and good imaging quality and suitable for the portable electronic products, is proposed in the present disclosure, in which the refractive powers are properly assigned and high order parameters of aspherical surfaces are optimized.

SUMMARY

To solve at least one of the problems in the prior art, the present disclosure provides an optical imaging lens assembly.

One aspect of the disclosure provides an optical imaging lens assembly including, sequentially from an object side to an image side, a first lens, a second lens, a third lens, a fourth lens, a fifth lens, and a sixth lens. The first lens has a positive refractive power with a convex object side surface and a concave image side surface; the second lens has a negative refractive power with a convex object side surface and a concave image side surface; the third lens has a refractive power; the fourth lens has a refractive power with a concave image side surface; the fifth lens has a refractive power; the sixth lens has a negative refractive power with a convex object side surface and a concave image side surface. An effective focal length f of the optical imaging lens assembly and an entrance pupil diameter EPD of the optical imaging lens assembly satisfy f/EPD<2.0, the effective focal length f of the optical imaging lens assembly and half of a maximum field of view HFOV of the optical imaging lens assembly satisfy 3.8<f*TAN(HFOV)<5, and a curvature radius R8 of the image side surface of the fourth lens satisfies R8≥500 mm.

According to an embodiment of the disclosure, a curvature radius R9 of an object side surface of the fifth lens and a curvature radius R10 of an image side surface of the fifth lens satisfy −3.5<R9/R10<0.6.

According to an embodiment of the disclosure, a distance TTL along an optical axis from the object side surface of the first lens to an imaging surface and half of a diagonal length ImgH of an effective pixel region on the imaging surface satisfy TTL/ImgH<1.5.

According to an embodiment of the disclosure, an effective focal length f1 of the first lens and an effective focal length f6 of the sixth lens satisfy −3.5<f6/f1<−2.5.

According to an embodiment of the disclosure, an effective focal length f2 of the second lens and the effective focal length f of the optical imaging lens assembly satisfy −4<f2/f<−2.5.

According to an embodiment of the disclosure, a curvature radius R1 of the object side surface of the first lens, a curvature radius R2 of the image side surface of the first lens, a curvature radius R3 of the object side surface of the second lens, and a curvature radius R4 of the image side surface of the second lens satisfy 0.2 (R1+R2)/(R3+R4)<0.5.

According to an embodiment of the disclosure, the effective focal length f of the optical imaging lens assembly, a curvature radius R11 of the object side surface of the sixth lens, and a curvature radius R12 of the image side surface of the sixth lens satisfy 0.7<f/(R11+R12)<1.3.

According to an embodiment of the disclosure, a central thickness CT4 of the fourth lens along an optical axis and a central thickness CT5 of the fifth lens along the optical axis satisfy 0.3 CT4/CT5<1.0.

According to an embodiment of the disclosure, an effective focal length f1 of the first lens and the effective focal length f of the optical imaging lens assembly satisfy 0.7<f1/f<1.

According to an embodiment of the disclosure, a space interval T23 between the second lens and the third lens along an optical axis and a central thickness CT3 of the third lens satisfy 0.5≤T23/CT3<0.9.

According to an embodiment of the disclosure, a central thickness CT1 of the first lens, a central thickness CT2 of the second lens, and a central thickness CT6 of the sixth lens satisfy 2<(CT1+CT2+CT6)/CT1<3.

According to an embodiment of the disclosure, a distance TTL along an optical axis from the object side surface of the first lens to an imaging surface and a sum of central thicknesses ΣCT along the optical axis from the first lens to the sixth lens satisfy 0.5≤ΣCT/TTL<0.7.

According to an embodiment of the disclosure, an edge thickness ET5 of the fifth lens and a central thickness CT5 of the fifth lens along an optical axis satisfy 0.5≤ET5/CT5<0.8.

According to an embodiment of the disclosure, a distance SAG41 along an optical axis from an intersection of an object side surface of the fourth lens and the optical axis to a vertex of an effective radius of the object side surface of the fourth lens and a central thickness CT4 of the fourth lens along the optical axis satisfy −0.6≤SAG41/CT4≤−0.2.

According to an embodiment of the disclosure, a space interval T56 between the fifth lens and the sixth lens along an optical axis and a space interval T45 between the fourth lens and the fifth lens along the optical axis satisfy T56/T45≤0.4.

The optical imaging lens assembly according to the disclosure is applicable to portable electronic products, and has an ultra-thin appearance, a large aperture and a good imaging quality.

BRIEF DESCRIPTION OF THE DRAWINGS

Other features, objects and advantages of the disclosure will become more apparent from the following detailed description of non-limiting embodiments in conjunction with the accompanying drawings, in which:

FIG. 11 shows a schematic structural diagram of an optical imaging lens assembly of Example 3;

FIGS. 12 to 15 show a longitudinal aberration curve, an astigmatic curve, a distortion curve and a lateral color curve of the optical imaging lens assembly of Example 3, respectively;

FIG. 16 shows a schematic structural diagram of an optical imaging lens assembly of Example 4;

FIGS. 17 to 20 show a longitudinal aberration curve, an astigmatic curve, a distortion curve and a lateral color curve of the optical imaging lens assembly of Example 4, respectively;

FIG. 21 shows a schematic structural diagram of an optical imaging lens assembly of Example 5;

FIGS. 22 to 25 show a longitudinal aberration curve, an astigmatic curve, a distortion curve and a lateral color curve of the optical imaging lens assembly of Example 5, respectively;

FIG. 41 shows a schematic structural diagram of an optical imaging lens assembly of Example 9; and FIGS. 42 to 45 show a longitudinal aberration curve, an astigmatic curve, a distortion curve and a lateral color curve of the optical imaging lens assembly of Example 9, respectively.

DETAILED DESCRIPTION OF EMBODIMENTS

Figure 1:
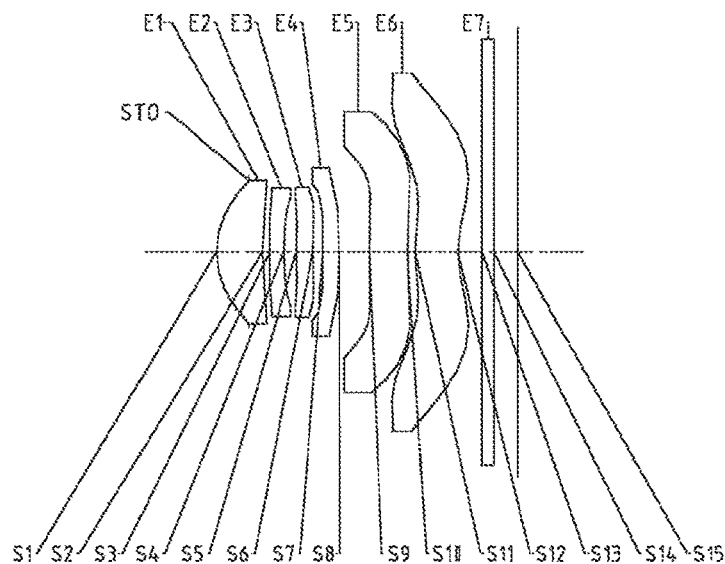
FIG. 1 shows a schematic structural diagram of an optical imaging lens assembly of Example 1.

Further details of the disclosure are described below with reference to the accompanying drawings and embodiments. It is understood that the specific embodiments described herein are used merely for explaining the related invention and should not be interpreted to be any limit to the invention. It should also be noted that, for ease of description, only the relevant parts of the disclosure are shown in the drawings.

It should be understood that in the disclosure, when an element or layer is described as being "on," "connected to," or "coupled to" another element or layer, it may be disposed directly on the another element or layer, directly connected or coupled to the another element or layer, or there may present an intermediate element or layer therebetween. When an element is referred to as being "directly on" another element or layer, "directly connected to," or "directly coupled to" another element or layer, there is no intermediate element or layer. Throughout the specification, the same reference numerals refer to the same elements. As used herein, the expression "and/or" includes any one of or any combination of the listed items.

It should be understood that while the terms 1st, 2nd or first, second, etc., may be used therein to modify various elements, components, regions, layers and/or segments, these elements, components, regions, layers and/or segments should not be limited by these terms. These terms are used merely for distinguishing one component, component, region, layer or segment from another component, component, region, layer or segment. Therefore, without departing from the teachings of the disclosure, a first element, component, region, layer or segment discussed below may be referred to as a second element, component, region, layer or segment.

The terms used herein are used merely for the purpose of describing specific embodiments and are not intended to limit the disclosure. As used herein, features that do not be specifically limited as a singular or plural form does not exclude the plural form unless explicitly indicated in the context. It should also be understood that the terms "include", "including," "having," "comprise," and/or "comprising" when used in this specification indicate the presence of stated features, integrals, steps, operations, elements and/or components, but do not exclude the presence or addition of one or more other features, integrals, steps, operations, elements, components and/or combinations thereof. As used herein, the expression "and/or" includes any one of or any combination of the listed items. The expressions such as "at least one of . . . " preceding a list of features modify the entire list of features rather than an individual element in the list. Further, the use of "may," when describing implementations of the disclosure, refers to "one or more implementations of the disclosure." Also, the term "exemplary" is intended to refer to an example or illustration.

Unless otherwise defined, all terms (including technical and scientific terms) used herein have the same meaning as commonly understood by those of ordinary skill in the art to which the disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly defined as that herein.

It should be noted that the embodiments of the disclosure and the features of the embodiments may be combined without conflict. The disclosure will be described in detail below with reference to the accompanying drawings and in conjunction with the embodiments.

The disclosure provides an optical imaging lens assembly including, sequentially from an object side to an image side, a first lens, a second lens, a third lens, a fourth lens, a fifth lens, and a sixth lens, wherein the first lens has a positive refractive power with a convex object side surface and a concave image side surface; the second lens has a negative refractive power with a convex object side surface and a concave image side surface; the third lens has a refractive power; the fourth lens has a refractive power with a concave image side surface; the fifth lens has a refractive power; and the sixth lens has a negative refractive power with a convex object side surface and a concave image side surface.

According to an embodiment of the disclosure, an effective focal length f of the optical imaging lens assembly and an entrance pupil diameter EPD of the optical imaging lens assembly satisfy f/EPD<2.0, the effective focal length f of the optical imaging lens assembly and half of a maximum field-of-view HFOV of the optical imaging lens assembly satisfy 3.8<f*TAN (HFOV)<5, and a curvature radius R8 of the image side surface of the fourth lens satisfies R8≥500 mm More specifically, f/EPD≤1.91, and 3.87≤f*TAN (HFOV)≤3.92 are satisfied. By satisfying the above relation, the effective focal length of the optical imaging lens assembly, half of the maximum field of view of the optical imaging lens assembly and the curvature radius of the fourth lens can be appropriately distributed, the size of the optical imaging lens assembly can be effectively compressed, the light deflection angle can be made small, the sensitivity of the optical imaging lens assembly can be effectively reduced, a large aperture and a ultra-thin characteristics may be achieved, injection molding processing may be facilitated, and high assembly yield can be achieved.

According to an embodiment of the disclosure, a curvature radius R9 of an object side surface of the fifth lens and a curvature radius R10 of an image side surface of the fifth lens satisfy−3.5<R9/R10<0.6, specifically, −2.04≤R9/R10≤0.53. By satisfying the above relation, the curvature radius of the image side surface of the fifth lens can be controlled, the imaging height of the light beam at the fifth lens can be controlled, and the aperture of the surface of the last lens can be controlled.

According to an embodiment of the disclosure, a distance TTL along an optical axis from an object side surface of the first lens to an imaging surface and half of a diagonal length ImgH of an effective pixel region on the imaging surface satisfy TTL/ImgH<1.5, specifically, TTL/ImgH≤1.36. By satisfying the above relation, the ratio between the distance along the optical axis from the object side surface of the first lens to the imaging surface and half of the diagonal length of the effective pixel region on the imaging surface can be restrained, and the ultra-thinning and high resolution characteristics of the optical imaging lens assembly can be realized.

According to an embodiment of the disclosure, an effective focal length f1 of the first lens and an effective focal length f6 of the sixth lens satisfy−3.5<f6/f1<−2.5, specifically, −2.98≤f6/f1≤−2.05. By satisfying the above-mentioned relation, the ratio between the effective focal lengths of the first lens and the sixth lens can be restrained, and the contribution to the field curvature of the two lenses can be controlled appropriately, so that the two lenses can be configured in a compensated state.

According to an embodiment of the disclosure, an effective focal length f2 of the second lens and the effective focal length f of the optical imaging lens assembly satisfy−4<f2/f<−2.5, more specifically, −3.52≤f2/f≤−2.05. By satisfying the above relation, the refractive power of the second lens and the effective focal length of the optical imaging lens assembly can be restrained, so that the contribution to the spherical aberration of the second lens can be controlled within a reasonable level to obtain good imaging quality at the on-axis field of view.

According to an embodiment of the disclosure, a curvature radius R1 of the object side surface of the first lens, a curvature radius R2 of the image side surface of the first lens, a curvature radius R3 of the object side surface of the second lens, and a curvature radius R4 of the image side surface of the second lens satisfy 0.2≤(R1+R2)/(R3+R4)<0.5, more specifically, 0.21≤(R1+R2)/(R3+R4)≤0.37. By satisfying the above-mentioned relation, the curvature radii of the object and image side surfaces of the first and second lenses can be controlled, so that the incident angle of the chief ray in each field of view at the imaging plane of the optical imaging lens assembly can be controlled appropriately, which can meet the requirements to the incident angle of the chief ray in the design of the optical system.

According to an embodiment of the disclosure, the effective focal length f of the optical imaging lens assembly, a curvature radius R11 of the object side surface of the sixth lens, and a curvature radius R12 of the image side surface of the sixth lens satisfy 0.7<f/(R11+R12)<1.3, specifically, 0.85≤f/(R11+R12)≤1.1. By satisfying the above relation, the curvature radii of the object and image side surfaces of the sixth lens can be controlled, so that the contribution to the fifth-order spherical aberration can be controlled to a certain extent, and the fifth-order spherical aberration of the sixth lens can be controlled within a reasonable range.

According to an embodiment of the disclosure, a central thickness CT4 of the fourth lens along an optical axis and a central thickness CT5 of the fifth lens along the optical axis satisfy 0.3<CT4/CT5<1.0, specifically, 0.38<CT4/CT5≤0.53. By satisfying the above relation, the ratio between the central thickness of the fourth lens and the central thickness of the fifth lens can be controlled, so that the contribution to distortion can be controlled within a reasonable range, and the distortions at various field-of-views can be eventually controlled below 2%, thereby avoiding software debugging in later processes.

According to an embodiment of the disclosure, an effective focal length f1 of the first lens and the effective focal length f of the optical imaging lens assembly satisfy 0.7<f1/f<1, specifically, 0.81≤f1/f≤0.91. By satisfying the above-mentioned relation, the positive refractive power of the first lens can be controlled within a reasonable range, so that not only the positive refractive power required by the optical imaging lens assembly can be satisfied, but also the contribution to the spherical aberration can be controlled in a reasonable and controllable range. In such a case, the negative spherical aberration can be corrected by the subsequent lenses and good imaging quality at the on-axis field of view can be achieved.

According to an embodiment of the disclosure, a space interval T23 between the second lens and the third lens along an optical axis and a central thickness CT3 of the third lens satisfy 0.5≤T23/CT3<0.9, specifically, 0.55≤T23/CT3≤0.85. By satisfying the above relation, the ratio between the space interval between the second lens and the third lens along the optical axis and the central thickness of the third lens can be restrained within a reasonable range, and thus the field curvature and the distortion of the system can be controlled effectively, and good imaging quality at the off-axis field of view can be achieved.

According to an embodiment of the disclosure, a central thickness CT1 of the first lens, a central thickness CT2 of the second lens, and a central thickness CT6 of the sixth lens satisfy 2<(CT1+CT2+CT6)/CT1<3, specifically 2.08≤(CT1+CT2+CT6)/CT1≤2.35. By satisfying the above relation, the central thicknesses of the first, second and sixth lenses can be restrained within a reasonable range, which can not only satisfy the manufacturability but also guarantee the ultra-thin characteristics of the optical system.

According to an embodiment of the disclosure, a distance TTL along an optical axis from the object side surface of the first lens to an imaging surface and a sum of central thicknesses ΣCT along the optical axis from the first lens to the sixth lens satisfy 0.5≤ΣCT/TTL<0.7, specifically 0.55≤ΣCT/TTL≤0.58. By satisfying the above relation, that is, by controlling the sum of the central thicknesses from the first lens to the sixth lens along the optical axis, the residual distortion after compensated can be controlled appropriately, so that the optical imaging lens assembly has a relative small distortion.

According to an embodiment of the disclosure, an edge thickness ET5 of the fifth lens and a central thickness CT5 of the fifth lens along an optical axis satisfy 0.5≤ET5/CT5<0.8, specifically 0.52≤ET5/CT5≤0.76. By restricting the ratio between the edge thickness of the fifth lens and the central thickness of the fifth lens along the optical axis, the lens can have good manufacturability characteristics.

According to an embodiment of the disclosure, a distance SAG41 along an optical axis from an intersection of an object side surface of the fourth lens and the optical axis to a vertex of an effective radius of the object side surface of the fourth lens and a central thickness CT4 of the fourth lens along the optical axis satisfy −0.6≤SAG41/CT4≤−0.2, specifically, −0.57 SAG41/CT45≤−0.28. By satisfying the above relation, the optical lens can effectively reduce the incident angle of the chief ray on the object side surface of the fourth lens, thereby improving the matching level between the lens assembly and the chip.

According to an embodiment of the disclosure, a space interval T56 between the fifth lens and the sixth lens along an optical axis and a space interval T45 between the fourth lens and the fifth lens along the optical axis satisfy T56/T45≤0.4, specifically, T56/T45≤0.36. By satisfying the above relation, the space interval between the fifth lens and the sixth lens along an optical axis and the space interval between the fourth lens and the fifth lens along the optical axis can be restrained to adjust the field curvature of the optical imaging lens assembly, so that the optical imaging lens assembly can achieve a reasonable field curvature.

The disclosure is further described below with reference to specific examples.

Example 1

First, an optical imaging lens assembly according to Example 1 of the disclosure is described with reference to FIGS. 1 to 5.

FIG. 1 is a schematic structural diagram showing the optical imaging lens assembly of Example 1. As shown in FIG. 1, the optical imaging lens assembly includes six lenses. The six lenses are a first lens E1 having an object side surface S and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, and a sixth lens E6 having an object side surface S11 and an image side surface S12, respectively. The first lens E1 to the sixth lens E6 are sequentially disposed from an object side to an image side of the optical imaging lens assembly.

The first lens E1 may have a positive refractive power. The object side surface S1 of the first lens E1 may be convex and the image side surface S2 of the first lens E1 is concave.

The second lens E2 may have a negative refractive power. The object side surface S3 of the second lens E2 may be convex and the image side surface S4 of the second lens E2 may be concave.

The third lens E3 may have a positive refractive power. The object side surface S5 of the third lens E3 may be convex, and the image side surface S6 of the third lens E3 may be concave.

The fourth lens E4 may have a positive refractive power. The object side surface S7 of the fourth lens E4 may be convex, and the image side surface S8 of the fourth lens E4 may be concave.

The fifth lens E5 may have a positive refractive power. The object side surface S9 of the fifth lens E5 may be convex, and the image side surface S10 of the fifth lens E5 may be concave.

The sixth lens E6 may have a negative refractive power. The object side surface S11 of the sixth lens E6 may be convex, and the image side surface S12 of the sixth lens E6 may be concave.

The optical imaging lens assembly further includes a filter E7 having an object side surface S13 and an image side surface S14 for filtering infrared light. In this example, the light from the object passes through the surfaces S1 to S14 in sequence and is finally imaged on the imaging surface S15.

In this example, the first lens E1 to the sixth lens E6 have effective focal lengths f1 to f6, respectively. The first lens E1 to the sixth lens E6 are sequentially arranged along the optical axis and collectively determine the total effective focal length f of the optical imaging lens assembly. Table 1 below shows the effective focal lengths f1 to f6 of the first lens E1 to the sixth lens E6, the total effective focal length f of the optical imaging lens assembly, a total length TTL (mm) of the optical imaging lens assembly, and half of a maximum field of view HFOV (°) of the optical imaging lens assembly.

TABLE 1

| f1 (mm) | 4.02 | f (mm) | 4.61 |
| f2 (mm) | −13.49 | TTL (mm) | 5.30 |
| f3 (mm) | 200.00 | HFOV (°) | 40.1 |
| f4 (mm) | 37.25 | | |
| f5 (mm) | 60.58 | | |
| f6 (mm) | −8.24 | | |

Table 2 shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 2

| | | | | Material | | |
| | | | | Refractive | Abbe | Conic |
| Surface No. | Surface Type | Curvature Radius | Thickness | Index | Number | Coefficient |
| --- | --- | --- | --- | --- | --- | --- |
| OBJ | Spherical | Infinite | Infinite | | | |
| STO | Spherical | Infinite | −0.5756 | | | |
| S1 | Aspherical | 1.6106 | 0.8098 | 1.55 | 56.1 | 0.0020 |
| S2 | Aspherical | 4.9687 | 0.1287 | | | 0.0000 |
| S3 | Aspherical | 18.1131 | 0.2500 | 1.67 | 20.4 | 23.3555 |
| S4 | Aspherical | 5.9783 | 0.2155 | | | 0.5243 |
| S5 | Aspherical | 8.1919 | 0.2937 | 1.55 | 56.1 | 9.2895 |
| S6 | Aspherical | 8.7443 | 0.1809 | | | −19.4268 |
| S7 | Aspherical | 23.4639 | 0.2849 | 1.65 | 23.5 | 99.0000 |

TABLE 2-continued

| Surface No. | Surface Type | Curvature Radius | Thickness | Material Refractive Index | Abbe Number | Conic Coefficient |
|---|---|---|---|---|---|---|
| S8 | Aspherical | 1025.0000 | 0.5380 | | | 99.0000 |
| S9 | Aspherical | 19.3240 | 0.6668 | 1.67 | 20.4 | −36.2477 |
| S10 | Aspherical | 36.5294 | 0.1356 | | | 99.0000 |
| S11 | Aspherical | 3.4120 | 0.7459 | 1.64 | 55.7 | −0.7135 |
| S12 | Aspherical | 1.7788 | 0.4242 | | | −1.0271 |
| S13 | Spherical | Infinite | 0.2100 | 1.52 | 64.2 | |
| S14 | Spherical | Infinite | 0.4189 | | | |
| S15 | Spherical | Infinite | | | | |

In this example, each lens may use aspherical lens, and the shape of each of the aspherical surfaces x is limited by the following formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the curvature radius in the above Table 2); k is the conic coefficient (shown in the above Table 2); and Ai is a correction coefficient for the i-th order of the aspheric surface.

Table 3 below shows the high-order coefficients of each of the aspherical surfaces S1-S12 that can be used for respective aspherical lens in this example.

TABLE 3

| Surface No. | A4 | A6 | A8 | A10 | A12 |
|---|---|---|---|---|---|
| S1 | −4.2297E−03 | 3.1168E−02 | −9.6676E−02 | 1.8335E−01 | −2.0947E−01 |
| S2 | −3.2159E−02 | 4.6612E−03 | −8.2453E−02 | 2.9075E−01 | −5.7862E−01 |
| S3 | −5.1597E−02 | 5.9104E−02 | −2.2228E−01 | 9.0445E−01 | −1.9947E+00 |
| S4 | −1.6125E−02 | 8.3187E−02 | −2.2424E−01 | 8.0182E−01 | −1.5797E+00 |
| S5 | −4.4936E−02 | −1.8022E−02 | 7.7700E−02 | −6.7044E−01 | 2.1361E+00 |
| S6 | −4.7860E−02 | −1.7929E−02 | 1.9760E−01 | −9.0594E−01 | 1.9839E+00 |
| S7 | −1.0141E−01 | −4.6538E−02 | 2.7557E−01 | −6.5332E−01 | 9.8528E−01 |
| S8 | −5.9675E−02 | −1.4969E−01 | 4.3466E−01 | −6.8029E−01 | 6.8619E−01 |
| S9 | 6.3373E−02 | −1.1170E−01 | 1.4644E−02 | 7.3567E−02 | −8.5461E−02 |
| S10 | 1.2512E−01 | −1.6595E−01 | 1.0651E−01 | −4.5970E−02 | 1.3428E−02 |
| S11 | −9.8712E−02 | −9.1777E−03 | 1.4565E−02 | −4.1604E−03 | 6.2442E−04 |
| S12 | −1.8050E−01 | 9.0197E−02 | −4.1517E−02 | 1.3172E−02 | −2.6922E−03 |

| Surface No. | A14 | A16 | A18 | A20 |
|---|---|---|---|---|
| S1 | 1.4101E−01 | −5.2575E−02 | 9.0400E−03 | −5.4036E−04 |
| S2 | 7.0512E−01 | −5.1864E−01 | 2.1035E−01 | −3.6072E−02 |
| S3 | 2.6262E+00 | −2.0573E+00 | 8.8559E−01 | −1.6083E−01 |
| S4 | 1.8614E+00 | −1.2318E+00 | 3.8025E−01 | −1.6699E−02 |
| S5 | −3.8400E+00 | 4.0361E+00 | −2.3268E+00 | 5.7336E−01 |
| S6 | −2.6132E+00 | 2.0719E+00 | −9.1612E−01 | 1.7500E−01 |
| S7 | −9.4390E−01 | 5.4532E−01 | −1.7521E−01 | 2.3620E−02 |
| S8 | −4.2021E−01 | 1.4820E−01 | −2.7450E−02 | 2.0391E−03 |
| S9 | 4.6657E−02 | −1.3943E−02 | 2.1856E−03 | 1.4044E−04 |
| S10 | −2.5893E−03 | 3.1540E−04 | −2.2086E−05 | 6.8195E−07 |
| S11 | −5.5446E−05 | 2.8632E−06 | −7.5314E−08 | 6.5322E−10 |
| S12 | 3.4767E−04 | −2.7367E−05 | 1.1980E−06 | −2.2363E−08 |

Figure 2:
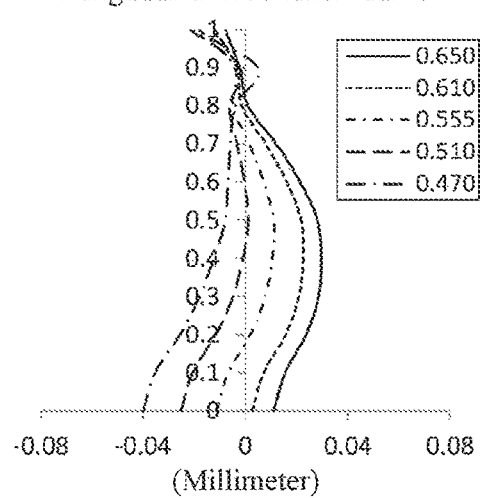
FIGS. 2 to 5 show the longitudinal aberration curve, an astigmatic curve, a distortion curve and a lateral color curve of the optical imaging lens assembly of Example 1, respectively.
Figure 3:
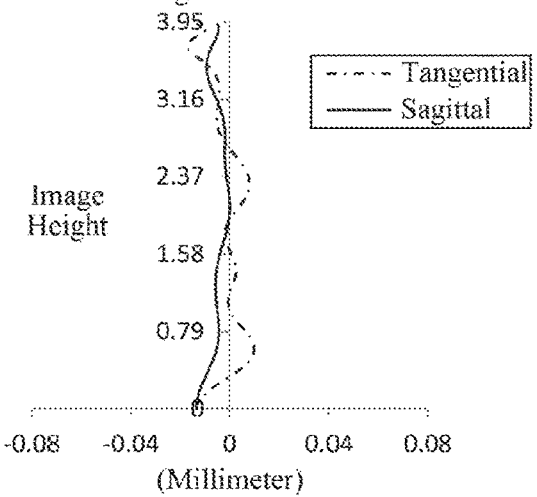
Figure 4:
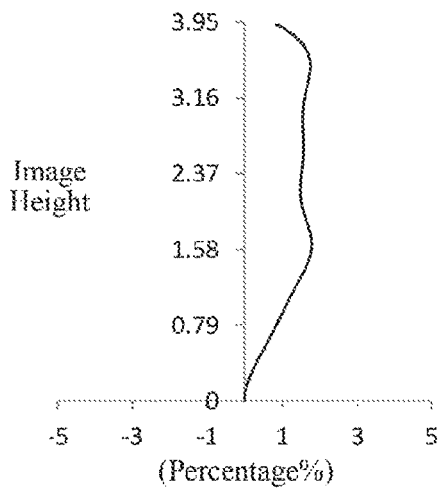
Figure 5:
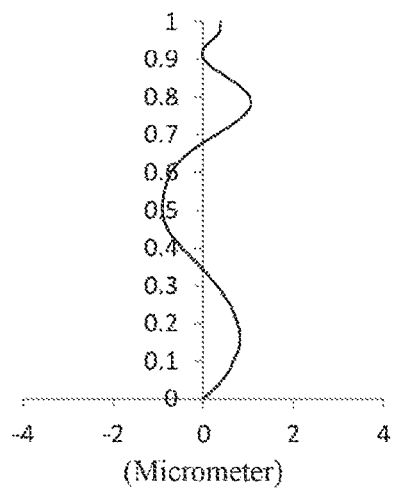

FIG. 2 illustrates a longitudinal aberration curve of the optical imaging system according to Example 1, representing deviations of focal points converged by light of different wavelengths after passing through the optical imaging system. FIG. 3 illustrates an astigmatic curve of the optical imaging system according to Example 1, representing a curvature of a tangential plane and a curvature of a sagittal plane. FIG. 4 illustrates a distortion curve of the optical imaging system according to Example 1, representing amounts of distortion corresponding to different FOVs. FIG. 5 illustrates a lateral color curve of the optical imaging system according to Example 1, representing deviations of different image heights on an image plane after light passes through the optical imaging system. It can be determined from the above description and FIGS. 2 to 5 that the optical imaging lens assembly according to Example 1 is applicable for portable electronic products, has an ultra-thin appearance and a large aperture, and has good imaging quality.

Example 2

An optical imaging lens assembly according to Example 2 of the disclosure is described below with reference to FIGS. 6 to 10.

Figure 6:
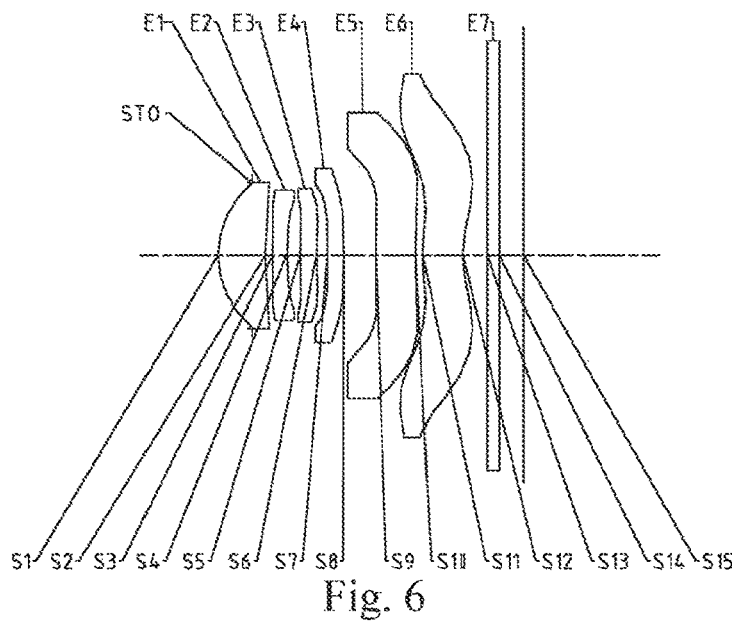
FIG. 6 shows a schematic structural diagram of an optical imaging lens assembly of Example 2.

FIG. 6 is a schematic structural diagram showing the optical imaging lens assembly of Example 2. As shown in FIG. 6, the optical imaging lens assembly includes six lenses. The six lenses are a first lens E1 having an object side surface S and an image side surface S2, a second lens E2 having an object side surface S3 and an image side surface S4, a third lens E3 having an object side surface S5 and an image side surface S6, a fourth lens E4 having an object side surface S7 and an image side surface S8, a fifth lens E5 having an object side surface S9 and an image side surface S10, and a sixth lens E6 having an object side surface S11 and an image side surface S12, respectively. The first lens E1 to the sixth lens E6 are sequentially disposed from an object side to an image side of the optical imaging lens assembly.

The first lens E1 may have a positive refractive power. The object side surface S1 of the first lens E1 may be convex and the image side surface S2 of the first lens E1 is concave.

The second lens E2 may have a negative refractive power. The object side surface S3 of the second lens E2 may be convex and the image side surface S4 of the second lens E2 may be concave.

The third lens E3 may have a negative refractive power. The object side surface S5 of the third lens E3 may be convex, and the image side surface S6 of the third lens E3 may be concave.

The fourth lens E4 may have a positive refractive power. The object side surface S7 of the fourth lens E4 may be convex, and the image side surface S8 of the fourth lens E4 may be concave.

The fifth lens E5 may have a positive refractive power. The object side surface S9 of the fifth lens E5 may be convex, and the image side surface S10 of the fifth lens E5 may be concave.

The sixth lens E6 may have a negative refractive power. The object side surface S11 of the sixth lens E6 may be convex, and the image side surface S12 of the sixth lens E6 may be concave.

Table 4 below shows effective focal lengths f1 to f6 of the first lens E1 to the sixth lens E6, a total effective focal length f of the optical imaging lens assembly, atotal length TTL of the optical imaging lens assembly, and half of a maximum field of view HFOV (°) of the optical imaging lens assembly.

TABLE 4

| f1 (mm) | 3.92 | f (mm) | 4.65 |
|---|---|---|---|
| f2 (mm) | −12.55 | TTL (mm) | 5.30 |
| f3 (mm) | −1000.00 | HFOV (°) | 39.8 |
| f4 (mm) | 32.78 | | |
| f5 (mm) | 68.85 | | |
| f6 (mm) | −8.53 | | |

Table 5 shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 5

| | | | | Material | | |
|---|---|---|---|---|---|---|
| Surface No. | Surface Type | Curvature Radius | Thickness | Refractive Index | Abbe Number | Conical Coefficient |
| OBJ | Spherical | Infinite | Infinite | | | |
| STO | Spherical | Infinite | −0.5842 | | | |
| S1 | Aspherical | 1.6003 | 0.8244 | 1.55 | 56.1 | 0.0027 |
| S2 | Aspherical | 5.1734 | 0.1260 | | | 0.0000 |
| S3 | Aspherical | 21.6322 | 0.2500 | 1.67 | 20.4 | 99.0000 |
| S4 | Aspherical | 6.0057 | 0.2268 | | | 5.5504 |
| S5 | Aspherical | 8.8343 | 0.2864 | 1.55 | 56.1 | −1.3607 |
| S6 | Aspherical | 8.5941 | 0.1873 | | | −45.9001 |
| S7 | Aspherical | 20.2799 | 0.2929 | 1.65 | 23.5 | 99.0000 |
| S8 | Aspherical | 500.0000 | 0.5567 | | | 99.0000 |
| S9 | Aspherical | 21.9294 | 0.6832 | 1.67 | 20.4 | 45.7520 |
| S10 | Aspherical | 41.4545 | 0.1230 | | | 99.0000 |
| S11 | Aspherical | 3.4267 | 0.6888 | 1.64 | 55.7 | −0.6600 |
| S12 | Aspherical | 1.8221 | 0.4263 | | | −0.9817 |
| S13 | Spherical | Infinite | 0.2100 | 1.52 | 64.2 | |
| S14 | Spherical | Infinite | 0.4210 | | | |
| S15 | Spherical | Infinite | | | | |

Table 6 below shows the high-order coefficients of each of the aspherical surfaces S1-S12 that can be used for respective aspherical lens in this example, wherein the shape of each of the aspherical surfaces may be defined by formula (1) given in Example 1 above.

TABLE 6

| Surface No. | A4 | A6 | A8 | A10 | A12 |
|---|---|---|---|---|---|
| S1 | −1.1719E−03 | 1.1665E−02 | −3.6435E−02 | 6.8719E−02 | −7.3038E−02 |
| S2 | −3.5348E−02 | 8.2635E−03 | −7.4041E−02 | 2.5126E−01 | −4.9108E−01 |
| S3 | −5.2828E−02 | 7.5454E−02 | −2.3794E−01 | 8.4626E−01 | −1.7519E+00 |
| S4 | −1.2961E−02 | 4.6725E−02 | 9.7096E−02 | −6.0115E−01 | 2.0126E+00 |
| S5 | −4.2843E−02 | −8.0115E−02 | 3.9833E−01 | −1.6830E+00 | 4.1460E+00 |
| S6 | −3.7852E−02 | −1.0070E−01 | 4.5628E−01 | −1.3805E+00 | 2.4612E+00 |
| S7 | −9.0837E−02 | −1.0491E−01 | 3.3548E−01 | −5.0114E−01 | 3.6536E−01 |
| S8 | −6.5753E−02 | −1.0927E−01 | 2.5063E−01 | −2.8639E−01 | 2.0554E−01 |
| S9 | 5.7100E−02 | −1.3119E−01 | 7.8880E−02 | −1.3363E−02 | −2.4156E−02 |
| S10 | 1.0596E−01 | −1.4137E−01 | 9.2608E−02 | −4.2747E−02 | 1.3658E−02 |
| S11 | −1.1883E−01 | 1.0795E−02 | 6.8045E−03 | −2.9002E−03 | 6.2685E−04 |
| S12 | −1.8440E−01 | 9.1226E−02 | −4.2533E−02 | 1.3972E−02 | −2.9862E−03 |

| Surface No. | A14 | A16 | A18 | A20 |
|---|---|---|---|---|
| S1 | 4.0152E−02 | −8.1965E−03 | −1.4001E−03 | 4.3007E−04 |
| S2 | 5.8650E−01 | −4.2283E−01 | 1.6820E−01 | −2.8296E−02 |
| S3 | 2.2052E+00 | −1.6653E+00 | 6.9527E−01 | −1.2290E−01 |
| S4 | −3.8036E+00 | 4.1709E+00 | −2.4770E+00 | 6.2695E−01 |
| S5 | −6.4022E+00 | 6.0384E+00 | −3.1834E+00 | 7.2269E−01 |
| S6 | −2.8026E+00 | 1.9726E+00 | −7.7903E−01 | 1.3344E−01 |
| S7 | −1.3858E−02 | −2.0420E−01 | 1.5076E−01 | −3.6033E−02 |
| S8 | −7.9554E−02 | 1.0681E−02 | 1.8548E−03 | −5.2506E−04 |
| S9 | 2.3149E−02 | −9.3448E−03 | 1.8354E−03 | −1.4228E−04 |
| S10 | −2.8841E−03 | 3.7993E−04 | −2.8167E−05 | 8.9675E−07 |
| S11 | −8.6768E−05 | 7.5497E−06 | −3.7043E−07 | 7.7448E−09 |
| S12 | 4.0436E−04 | −3.3369E−05 | 1.5307E−06 | −2.9943E−08 |

Figure 7:
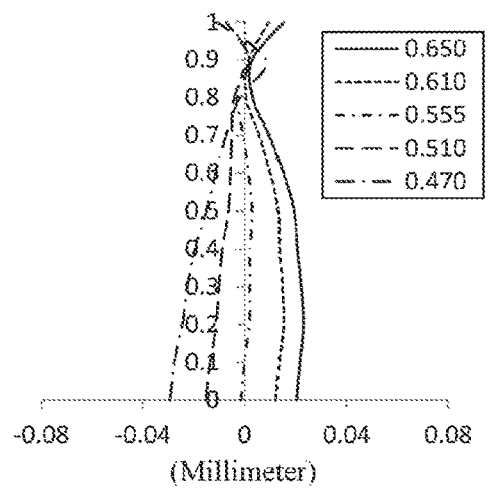
FIGS. 7 to 10 show a longitudinal aberration curve, an astigmatic curve, a distortion curve and a lateral color curve of the optical imaging lens assembly of Example 2, respectively.
Figure 8:
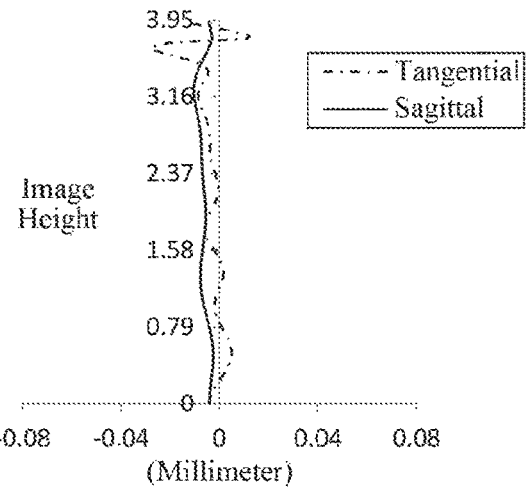
Figure 9:
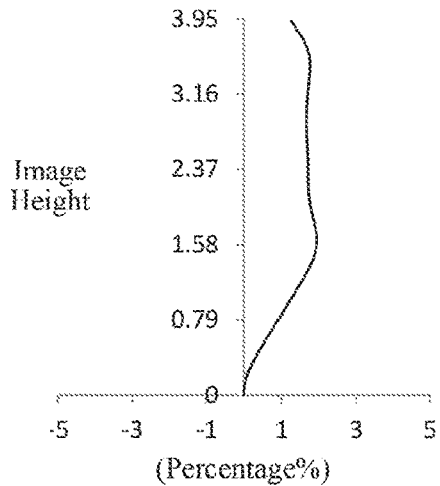
Figure 10:
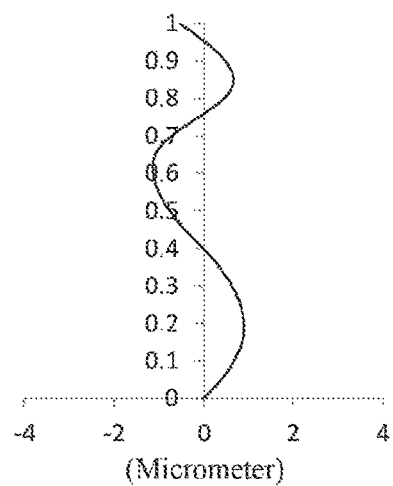

FIG. 7 illustrates a longitudinal aberration curve of the optical imaging system according to Example 2, representing deviations of focal points converged by light of different wavelengths after passing through the optical imaging system. FIG. 8 illustrates an astigmatic curve of the optical imaging system according to Example 2, representing a curvature of a tangential plane and a curvature of a sagittal plane. FIG. 9 illustrates a distortion curve of the optical imaging system according to Example 2, representing amounts of distortion corresponding to different FOVs. FIG. 10 illustrates a lateral color curve of the optical imaging system according to Example 2, representing deviations of different image heights on an image plane after light passes through the optical imaging system. It can be determined from the above description and FIGS. 7 to 10 that the optical imaging lens assembly according to Example 2 is applicable for portable electronic products, has an ultra-thin appearance and a large aperture, and has good imaging quality.

Example 3

An optical imaging lens assembly according to Example 3 of the disclosure is described below with reference to FIGS. 11 to 15.

FIG. 11 is a schematic structural diagram showing the optical imaging lens assembly of Example 3. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be convex.

The fourth lens E4 may have a negative refractive power. An object side surface S7 of the fourth lens E4 may be concave, and an image side surface S8 of the fourth lens E4 may be concave.

The fifth lens E5 may have a positive refractive power. An object side surface S9 of the fifth lens E5 may be convex, and an image side surface S10 of the fifth lens E5 may be concave.

The sixth lens E6 may have a negative refractive power. An object side surface S11 of the sixth lens E6 may be convex, and an image side surface S12 of the sixth lens E6 may be concave.

Table 7 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 7

| f1 (mm) | 3.95 | f (mm) | 4.52 |
| f2 (mm) | −15.91 | TTL (mm) | 5.27 |
| f3 (mm) | 54.11 | HFOV (°) | 40.6 |
| f4 (mm) | −132.07 | | |
| f5 (mm) | 36.58 | | |
| f6 (mm) | −8.21 | | |

Table 8 shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 8

| | | | | Materials | | |
| Surface No. | Surface Type | Curvature Radius | Thickness | Refractive Index | Abbe Number | Conic Coefficient |
| --- | --- | --- | --- | --- | --- | --- |
| OBJ | Spherical | Infinite | Infinite | | | |
| STO | Spherical | Infinite | −0.5767 | | | |
| S1 | Aspherical | 1.6080 | 0.8165 | 1.55 | 56.1 | −0.0033 |
| S2 | Aspherical | 5.1954 | 0.1291 | | | −0.1324 |
| S3 | Aspherical | 25.5033 | 0.2573 | 1.67 | 20.4 | 99.0000 |
| S4 | Aspherical | 7.4632 | 0.2554 | | | 1.1230 |
| S5 | Aspherical | 200.0000 | 0.3167 | 1.55 | 56.1 | 99.0000 |
| S6 | Aspherical | −34.6368 | 0.1381 | | | 99.0000 |
| S7 | Aspherical | −88.9217 | 0.2566 | 1.65 | 23.5 | −99.0000 |
| S8 | Aspherical | 2000.0000 | 0.4795 | | | −99.0000 |
| S9 | Aspherical | 11.7846 | 0.6686 | 1.67 | 20.4 | −57.3277 |
| S10 | Aspherical | 22.2771 | 0.1652 | | | −38.1782 |
| S11 | Aspherical | 3.4832 | 0.7439 | 1.64 | 55.7 | −0.7343 |
| S12 | Aspherical | 1.8002 | 0.2676 | | | −1.0102 |
| S13 | Spherical | Infinite | 0.2100 | 1.52 | 64.2 | |
| S14 | Spherical | Infinite | 0.5611 | | | |
| S15 | Spherical | Infinite | | | | |

Table 9 below shows the high-order coefficients of each of the aspherical surfaces S1-S12 that can be used for respective aspherical lens in this example, wherein the shape of each of the aspherical surfaces may be defined by formula (1) given in Example 1 above.

TABLE 9

| Surface No. | A4 | A6 | A8 | A10 | A12 |
| --- | --- | --- | --- | --- | --- |
| S1 | −5.3141E−03 | 3.5750E−02 | −1.0141E−01 | 1.6983E−01 | −1.5802E−01 |
| S2 | −3.3751E−02 | 1.7731E−02 | −1.3556E−01 | 4.4615E−01 | −8.5901E−01 |
| S3 | −5.6172E−02 | 8.2455E−02 | −3.0313E−01 | 1.1473E+00 | −2.4451E+00 |
| S4 | −1.3287E−02 | 2.5433E−02 | 1.8836E−01 | −8.2043E−01 | 2.3820E+00 |
| S5 | −2.4711E−02 | −2.0953E−01 | 1.2854E+00 | −5.3371E+00 | 1.3286E+01 |
| S6 | −9.9644E−03 | −2.6318E−01 | 1.1059E+00 | −3.1512E+00 | 5.5931E+00 |
| S7 | −6.0578E−02 | −2.5827E−01 | 7.9275E−01 | −1.4228E+00 | 1.6525E+00 |
| S8 | −3.5338E−02 | −2.7598E−01 | 7.0382E−01 | −1.0275E+00 | 9.6144E−01 |
| S9 | 5.7623E−02 | −8.6378E−02 | −3.6228E−02 | 1.3345E−01 | −1.2872E−01 |

TABLE 9-continued

| S10 | 9.5539E−02 | −1.1721E−01 | 6.1520E−02 | −1.9687E−02 | 3.4752E−03 |
| S11 | −1.2002E−01 | 1.1617E−02 | 4.9595E−03 | −1.7599E−03 | 2.8856E−04 |
| S12 | −1.6993E−01 | 7.5095E−02 | −3.0506E−02 | 8.6818E−03 | −1.6089E−03 |

| Surface No. | A14 | A16 | A18 | A20 |
|---|---|---|---|---|
| S1 | 6.7570E−02 | 1.9332E−03 | −1.1805E−02 | 2.6811E−03 |
| S2 | 1.0174E+00 | −7.3170E−01 | 2.9219E−01 | −4.9571E−02 |
| S3 | 3.1333E+00 | −2.4035E+00 | 1.0197E+00 | −1.8355E−01 |
| S4 | −4.2212E+00 | 4.4757E+00 | −2.6193E+00 | 6.6326E−01 |
| S5 | −2.0521E+01 | 1.9246E+01 | −1.0054E+01 | 2.2518E+00 |
| S6 | −6.3996E+00 | 4.5922E+00 | −1.8797E+00 | 3.3581E−01 |
| S7 | −1.2773E+00 | 6.5097E−01 | −2.0115E−01 | 2.7587E−02 |
| S8 | −5.5043E−01 | 1.8247E−01 | −3.1635E−02 | 2.1575E−03 |
| S9 | 6.5985E−02 | −1.9138E−02 | 2.9545E−03 | −1.8849E−04 |
| S10 | −1.7947E−04 | −4.3103E−05 | 7.6903E−06 | −3.7238E−07 |
| S11 | −3.0372E−05 | 2.1448E−06 | −9.2635E−08 | 1.8182E−09 |
| S12 | 1.8945E−04 | −1.3626E−05 | 5.4588E−07 | −9.3549E−09 |

FIG. 12 illustrates a longitudinal aberration curve of the optical imaging system according to Example 3, representing deviations of focal points converged by light of different wavelengths after passing through the optical imaging system. FIG. 13 illustrates an astigmatic curve of the optical imaging system according to Example 3, representing a curvature of a tangential plane and a curvature of a sagittal plane. FIG. 14 illustrates a distortion curve of the optical imaging system according to Example 3, representing amounts of distortion corresponding to different FOVs. FIG. 15 illustrates a lateral color curve of the optical imaging system according to Example 3, representing deviations of different image heights on an image plane after light passes through the optical imaging system. It can be determined from the above description and FIGS. 12 to 15 that the optical imaging lens assembly according to Example 3 is applicable for portable electronic products, has an ultra-thin appearance and a large aperture, and has good imaging quality.

Example 4

An optical imaging lens assembly according to Example 4 of the disclosure is described below with reference to FIGS. 16 to 20.

FIG. 16 is a schematic structural diagram showing the optical imaging lens assembly of Example 4. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be concave, and an image side surface S6 of the third lens E3 may be convex.

The fourth lens E4 may have a positive refractive power. An object side surface S7 of the fourth lens E4 may be convex, and an image side surface S8 of the fourth lens E4 may be concave.

The fifth lens E5 may have a positive refractive power. An object side surface S9 of the fifth lens E5 may be convex, and an image side surface S10 of the fifth lens E5 may be concave.

The sixth lens E6 may have a negative refractive power. An object side surface S11 of the sixth lens E6 may be convex, and an image side surface S12 of the sixth lens E6 may be concave.

Table 10 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 10

| f1 (mm) | 3.95 | f (mm) | 4.57 |
| f2 (mm) | −15.41 | TTL (mm) | 5.30 |
| f3 (mm) | 67.34 | HFOV (°) | 40.3 |
| f4 (mm) | 411.00 | | |
| f5 (mm) | 51.35 | | |
| f6 (mm) | −8.19 | | |

Table 11 below shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 11

| | | | | Material | | |
|---|---|---|---|---|---|---|
| Surface No. | Surface Type | Curvature Radius | Thickness | Refractive Index | Abbe Number | Conic Coefficient |
| OBJ | Spherical | Infinite | Infinite | | | |
| STO | Spherical | Infinite | −0.5752 | | | |
| S1 | Aspherical | 1.6072 | 0.8137 | 1.55 | 56.1 | 0.0079 |
| S2 | Aspherical | 5.1741 | 0.1278 | | | 0.0000 |
| S3 | Aspherical | 21.4708 | 0.2500 | 1.67 | 20.4 | 30.2176 |
| S4 | Aspherical | 6.9184 | 0.2608 | | | 2.7171 |
| S5 | Aspherical | −333.3333 | 0.3211 | 1.55 | 56.1 | −99.0000 |
| S6 | Aspherical | −33.1180 | 0.1291 | | | 99.0000 |
| S7 | Aspherical | 173.2063 | 0.2673 | 1.65 | 23.5 | 0.0000 |
| S8 | Aspherical | 500.0000 | 0.5167 | | | 0.0000 |
| S9 | Aspherical | 16.4179 | 0.6506 | 1.67 | 20.4 | −72.7749 |
| S10 | Aspherical | 31.0357 | 0.1544 | | | 81.4766 |
| S11 | Aspherical | 3.5375 | 0.7724 | 1.64 | 55.7 | −0.6844 |
| S12 | Aspherical | 1.8103 | 0.4169 | | | −1.0013 |
| S13 | Spherical | Infinite | 0.2100 | 1.52 | 64.2 | |
| S14 | Spherical | Infinite | 0.4118 | | | |
| S15 | Spherical | Infinite | | | | |

Table 12 below shows the high-order coefficients of each of the aspherical surfaces S1-S12 that can be used for respective aspherical lens in this example, wherein the shape of each of the aspherical surfaces may be defined by formula (1) given in the Example 1 above.

TABLE 12

| Surface No. | A4 | A6 | A8 | A10 | A12 |
|---|---|---|---|---|---|
| S1 | −5.0263E−03 | 3.3461E−02 | −9.2938E−02 | 1.5159E−01 | −1.3381E−01 |
| S2 | −3.3674E−02 | 1.4209E−02 | −1.1702E−01 | 3.9637E−01 | −7.7646E−01 |
| S3 | −5.6826E−02 | 8.3535E−02 | −3.0650E−01 | 1.1589E+00 | −2.4714E+00 |
| S4 | −1.4124E−02 | 2.9423E−02 | 1.6995E−01 | −7.6358E−01 | 2.2707E+00 |
| S5 | −1.3417E−02 | −2.8739E−01 | 1.6391E+00 | −6.3480E+00 | 1.5143E+01 |
| S6 | −4.0249E−03 | −2.9192E−01 | 1.1564E+00 | −3.1936E+00 | 5.5829E+00 |
| S7 | −6.0643E−02 | −2.2429E−01 | 6.3448E−01 | −1.0568E+00 | 1.1147E+00 |
| S8 | −2.8299E−02 | −2.7118E−01 | 6.8257E−01 | −1.0022E+00 | 9.4651E−01 |
| S9 | 6.2862E−02 | −9.0847E−02 | −2.8835E−02 | 1.2275E−01 | −1.1924E−01 |
| S10 | 9.6394E−02 | −1.1471E−01 | 5.7029E−02 | −1.6371E−02 | 2.0080E−03 |
| S11 | −1.1902E−01 | 1.3040E−02 | 3.4704E−03 | −1.2490E−03 | 2.0285E−04 |
| S12 | −1.6814E−01 | 7.4130E−02 | −2.9544E−02 | 8.2045E−03 | −1.4843E−03 |

| Surface No. | A14 | A16 | A18 | A20 |
|---|---|---|---|---|
| S1 | 4.7352E−02 | 1.2293E−02 | −1.4791E−02 | 3.0526E−03 |
| S2 | 9.3089E−01 | −6.7594E−01 | 2.7200E−01 | 4.6432E−02 |
| S3 | 3.1697E+00 | −2.4325E+00 | 1.0320E+00 | −1.8565E−01 |
| S4 | −4.0835E+00 | 4.3731E+00 | −2.5768E+00 | 6.5583E−01 |
| S5 | −2.2712E+01 | 2.0859E+01 | −1.0729E+01 | 2.3734E+00 |
| S6 | −6.3542E+00 | 4.5722E+00 | −1.8847E+00 | 3.3902E−01 |
| S7 | −7.7629E−01 | 3.7421E−01 | −1.1991E−01 | 1.7903E−02 |
| S8 | −5.4737E−01 | 1.8376E−01 | −3.2467E−02 | 2.2893E−03 |
| S9 | 6.0964E−02 | −1.7567E−02 | 2.6873E−03 | −1.6958E−04 |
| S10 | 2.2758E−04 | −1.1156E−04 | 1.4024E−05 | −6.1845E−07 |
| S11 | −2.3005E−05 | 1.8799E−06 | −9.4568E−08 | 2.0933E−09 |
| S12 | 1.7071E−04 | −1.1992E−05 | 4.6915E−07 | −7.8553E−09 |

FIG. 17 illustrates a longitudinal aberration curve of the optical imaging system according to Example 4, representing deviations of focal points converged by light of different wavelengths after passing through the optical imaging system. FIG. 18 illustrates an astigmatic curve of the optical imaging system according to Example 4, representing a curvature of a tangential plane and a curvature of a sagittal plane. FIG. 19 illustrates a distortion curve of the optical imaging system according to Example 4, representing amounts of distortion corresponding to different FOVs. FIG. 20 illustrates a lateral color curve of the optical imaging system according to Example 4, representing deviations of different image heights on an image plane after light passes through the optical imaging system. It can be determined from the above description and FIGS. 17 to 20 that the optical imaging lens assembly according to Example 4 is applicable for portable electronic products, has an ultra-thin appearance and a large aperture, and has good imaging quality.

Example 5

An optical imaging lens assembly according to Example 5 of the disclosure is described below with reference to FIGS. 21 to 25.

FIG. 21 is a schematic structural diagram showing the optical imaging lens assembly of Example 5. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a negative refractive power. An object side surface S5 of the third lens E3 may be convex, and an image side surface S6 of the third lens E3 may be concave.

The fourth lens E4 may have a positive refractive power. An object side surface S7 of the fourth lens E4 may be convex, and an image side surface S8 of the fourth lens E4 may be concave.

The fifth lens E5 may have a negative refractive power. An object side surface S9 of the fifth lens E5 may be concave, and an image side surface S10 of the fifth lens E5 may be concave.

The sixth lens E6 may have a negative refractive power. An object side surface S11 of the sixth lens E6 may be convex, and an image side surface S12 of the sixth lens E6 may be concave.

Table 13 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 13

| f1 (mm) | 3.95 | f (mm) | 4.59 |
|---|---|---|---|
| f2 (mm) | −14.40 | TTL (mm) | 5.30 |
| f3 (mm) | −1000.00 | HFOV (°) | 40.1 |
| f4 (mm) | 45.00 | | |
| f5 (mm) | −361.56 | | |
| f6 (mm) | −11.75 | | |

The following Table 14 shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 14

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5775 | | | |
| S1 | Aspherical | 1.5979 | 0.8129 | 1.55 | 56.1 | 0.0034 |
| S2 | Aspherical | 5.0658 | 0.1278 | | | 0.0000 |
| S3 | Aspherical | 19.3315 | 0.2500 | 1.67 | 20.4 | 88.5370 |
| S4 | Aspherical | 6.3815 | 0.2288 | | | 5.1067 |
| S5 | Aspherical | 11.2510 | 0.2883 | 1.55 | 56.1 | 10.0570 |
| S6 | Aspherical | 10.9240 | 0.1697 | | | −77.5063 |
| S7 | Aspherical | 27.4219 | 0.2840 | 1.65 | 23.5 | 99.0000 |
| S8 | Aspherical | 500.0000 | 0.4977 | | | 99.0000 |
| S9 | Aspherical | −269.4782 | 0.6197 | 1.67 | 20.4 | −99.0000 |
| S10 | Aspherical | 2294.4100 | 0.0648 | | | 99.0000 |
| S11 | Aspherical | 3.1127 | 0.8463 | 1.64 | 55.7 | −0.7541 |
| S12 | Aspherical | 1.8864 | 0.4538 | | | −1.0094 |
| S13 | Spherical | Infinite | 0.2100 | 1.52 | 64.2 | |
| S14 | Spherical | Infinite | 0.4490 | | | |
| S15 | Spherical | Infinite | | | | |

Table 15 below shows the high-order coefficients of each of the aspherical surfaces S1-S12 that can be used for respective aspherical lens in this example, wherein the shape of each of the aspherical surfaces may be defined by formula (1) given in the Example 1 above.

TABLE 15

| Surface No. | A4 | A6 | A8 | A10 | A12 |
|---|---|---|---|---|---|
| S1 | −4.6613E−03 | 3.1574E−02 | −9.2693E−02 | 1.6245E−01 | −1.6158E−01 |
| S2 | −3.4566E−02 | 2.1400E−02 | −1.4821E−01 | 4.8888E−01 | −9.5007E−01 |
| S3 | −5.5682E−02 | 8.4510E−02 | −2.9224E−01 | 1.0961E+00 | −2.3828E+00 |
| S4 | −1.5452E−02 | 4.0582E−02 | 1.1906E−01 | −5.4519E−01 | 1.6290E+00 |
| S5 | −4.4173E−02 | −9.0054E−02 | 5.3359E−01 | −2.2941E+00 | 5.6898E+00 |
| S6 | −6.0281E−02 | 6.0943E−02 | −1.4465E−01 | 2.4954E−02 | 3.6283E−01 |
| S7 | −9.9294E−02 | −6.2648E−02 | 2.1062E−01 | −2.2809E−01 | −4.7032E−03 |
| S8 | −5.4611E−02 | −1.7773E−01 | 4.6958E−01 | −7.0940E−01 | 7.1353E−01 |
| S9 | 8.5548E−02 | −1.2193E−01 | −1.0925E−02 | 1.3136E−01 | −1.4811E−01 |
| S10 | 1.0493E−01 | −1.2620E−01 | 6.8740E−02 | −2.4858E−02 | 5.8188E−03 |
| S11 | −1.3171E−01 | 1.9733E−02 | 2.9705E−03 | −1.5340E−03 | 2.6767E−04 |
| S12 | −1.6627E−01 | 7.8757E−02 | −3.4375E−02 | 1.0635E−02 | −2.1603E−03 |

| Surface No. | A14 | A16 | A18 | A20 |
|---|---|---|---|---|
| S1 | 8.0483E−02 | −9.2126E−03 | −7.4910E−03 | 2.0411E−03 |
| S2 | 1.1248E+00 | −8.0038E−01 | 3.1420E−01 | −5.2251E−02 |
| S3 | 3.1181E+00 | −2.4276E+00 | 1.0386E+00 | −1.8748E−01 |
| S4 | −2.9662E+00 | 3.2390E+00 | −1.9458E+00 | 5.0575E−01 |
| S5 | −8.7595E+00 | 8.2175E+00 | −4.3226E+00 | 9.8458E−01 |
| S6 | −8.0504E−01 | 8.1323E−01 | −4.1790E−01 | 9.0098E−02 |
| S7 | 3.2048E−01 | −3.8784E−01 | 1.9740E−01 | −3.8623E−02 |
| S8 | −4.4067E−01 | 1.5696E−01 | −2.9325E−02 | 2.1942E−03 |
| S9 | 8.5623E−02 | −2.7695E−02 | 4.7320E−03 | −3.3204E−04 |
| S10 | −7.7594E−04 | 3.9190E−05 | 2.0423E−06 | −2.2620E−07 |
| S11 | −2.6616E−05 | 1.5908E−06 | −5.2663E−08 | 7.2246E−10 |
| S12 | 2.7905E−04 | −2.1960E−05 | 9.5808E−07 | −1.7761E−08 |

FIG. 22 illustrates a longitudinal aberration curve of the optical imaging system according to Example 5, representing deviations of focal points converged by light of different wavelengths after passing through the optical imaging system. FIG. 23 illustrates an astigmatic curve of the optical imaging system according to Example 5, representing a curvature of a tangential plane and a curvature of a sagittal plane. FIG. 24 illustrates a distortion curve of the optical imaging system according to Example 5, representing amounts of distortion corresponding to different FOVs. FIG. 25 illustrates a lateral color curve of the optical imaging system according to Example 5, representing deviations of different image heights on an image plane after light passes through the optical imaging system. It can be determined from the above description and FIGS. 22 to 25 that the optical imaging lens assembly according to Example 5 is applicable for portable electronic products, has an ultra-thin appearance and a large aperture, and has good imaging quality.

Example 6

An optical imaging lens assembly according to Example 6 of the disclosure is described below with reference to FIGS. 26 to 30.

Figure 26:
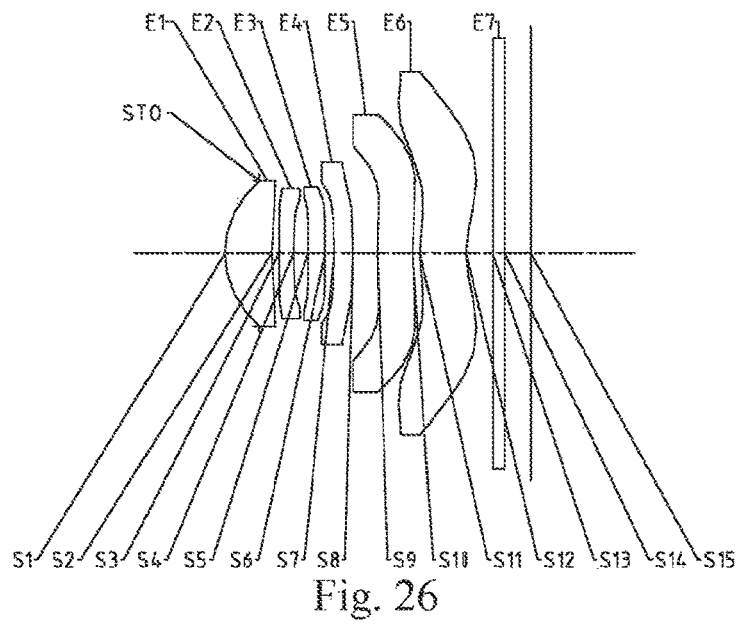
FIG. 26 shows a schematic structural diagram of an optical imaging lens assembly of Example 6.

FIG. 26 is a schematic structural diagram showing the optical imaging lens assembly of Example 6. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a negative refractive power. An object side surface S5 of the third lens E3 may be convex, and an image side surface S6 of the third lens E3 may be concave.

The fourth lens E4 may have a negative refractive power. An object side surface S7 of the fourth lens E4 may be convex, and an image side surface S8 of the fourth lens E4 may be concave.

The fifth lens E5 may have a positive refractive power. An object side surface S9 of the fifth lens E5 may be convex, and an image side surface S10 of the fifth lens E5 may be concave.

The sixth lens E6 may have a negative refractive power. An object side surface S11 of the sixth lens E6 may be convex, and an image side surface S12 of the sixth lens E6 may be concave.

Table 16 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 16

| f1 (mm) | 3.93 | f (mm) | 4.58 |
|---|---|---|---|
| f2 (mm) | −15.82 | TTL (mm) | 5.30 |
| f3 (mm) | −1000.00 | HFOV (°) | 40.2 |
| f4 (mm) | −1000.00 | | |
| f5 (mm) | 45.59 | | |
| f6 (mm) | −10.67 | | |

Table 17 below shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 17

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.5748 | | | |
| S1 | Aspherical | 1.5979 | 0.8123 | 1.55 | 56.1 | 0.0081 |
| S2 | Aspherical | 5.1427 | 0.1274 | | | 0.0000 |
| S3 | Aspherical | 21.0050 | 0.2500 | 1.67 | 20.4 | 87.7022 |
| S4 | Aspherical | 6.9885 | 0.2521 | | | 4.4979 |
| S5 | Aspherical | 21.0550 | 0.2954 | 1.55 | 56.1 | 23.1275 |
| S6 | Aspherical | 20.1726 | 0.1584 | | | −93.1433 |
| S7 | Aspherical | 2229.6734 | 0.3250 | 1.65 | 23.5 | 99.0000 |
| S8 | Aspherical | 500.0000 | 0.4308 | | | 99.0000 |
| S9 | Aspherical | 14.5906 | 0.6100 | 1.67 | 20.4 | 8.7211 |
| S10 | Aspherical | 27.5815 | 0.1212 | | | 24.4920 |
| S11 | Aspherical | 3.2256 | 0.7981 | 1.64 | 55.7 | −0.7535 |
| S12 | Aspherical | 1.8851 | 0.4584 | | | −0.9935 |
| S13 | Spherical | Infinite | 0.2100 | 1.52 | 64.2 | |
| S14 | Spherical | Infinite | 0.4537 | | | |
| S15 | Spherical | Infinite | | | | |

Table 18 below shows the high-order coefficients of each of the aspherical surfaces S1-S12 that can be used for respective aspherical lens in this example, wherein the shape of each of the aspherical surfaces may be defined by formula (1) given in Example 1 above.

TABLE 18

| Surface No. | A4 | A6 | A8 | A10 | A12 |
|---|---|---|---|---|---|
| S1 | −6.8390E−03 | 4.4165E−02 | −1.3180E−01 | 2.3539E−01 | −2.4437E−01 |
| S2 | −3.5325E−02 | 3.2959E−02 | −2.1053E−01 | 6.7321E−01 | −1.2742E+00 |
| S3 | −5.6147E−02 | 9.0454E−02 | −3.2716E−01 | 1.2115E+00 | −2.5930E+00 |
| S4 | −1.2140E−02 | 7.2404E−03 | 3.2214E−01 | −1.3103E+00 | 3.4634E+00 |
| S5 | −2.7573E−02 | −2.6586E−01 | 1.4565E+00 | −5.3383E+00 | 1.2010E+01 |
| S6 | −6.9801E−02 | 9.3246E−02 | −3.3473E−01 | 6.1622E−01 | −7.9009E−01 |
| S7 | −1.0333E−01 | 1.1898E−02 | −6.3224E−02 | 4.5826E−01 | −1.0856E+00 |
| S8 | −5.8911E−02 | −1.5748E−01 | 4.1682E−01 | −5.8810E−01 | 5.5243E−01 |
| S9 | 6.9212E−02 | −1.2918E−01 | 2.4705E−02 | 7.5373E−02 | −9.4579E−02 |
| S10 | 1.0572E−01 | −1.3292E−01 | 7.1676E−02 | −2.3914E−02 | 4.6845E−03 |
| S11 | −1.2164E−01 | 1.3091E−02 | 4.9207E−03 | −1.9515E−03 | 3.5461E−04 |
| S12 | −1.6407E−01 | 7.4089E−02 | −3.1472E−02 | 9.5882E−03 | −1.9407E−03 |

| Surface No. | A14 | A16 | A18 | A20 |
|---|---|---|---|---|
| S1 | 1.3693E−01 | −3.0898E−02 | −3.5311E−03 | 1.8341E−03 |
| S2 | 1.4737E+00 | −1.0261E+00 | 3.9461E−01 | −6.4310E−02 |
| S3 | 3.3472E+00 | −2.5770E+00 | 1.0920E+00 | −1.9531E−01 |
| S4 | −5.7319E+00 | 5.7832E+00 | −3.2537E+00 | 7.9428E−01 |
| S5 | −1.7025E+01 | 1.4812E+01 | −7.2410E+00 | 1.5306E+00 |
| S6 | 5.9858E−01 | −2.1586E−01 | 1.6446E−03 | 1.6544E−02 |
| S7 | 1.3304E+00 | −9.2492E−01 | 3.4572E−01 | −5.4563E−02 |
| S8 | −3.2494E−01 | 1.1232E−01 | −2.0748E−02 | 1.5731E−03 |
| S9 | 5.4841E−02 | −1.7415E−02 | 2.8988E−03 | −1.9738E−04 |
| S10 | −3.8620E−04 | −2.7858E−05 | 7.9572E−06 | −4.4033E−07 |
| S11 | −4.1242E−05 | 3.1422E−06 | −1.4150E−07 | 2.8139E−09 |
| S12 | 2.5255E−04 | −2.0195E−05 | 9.0125E−07 | −1.7186E−08 |

Figure 27:
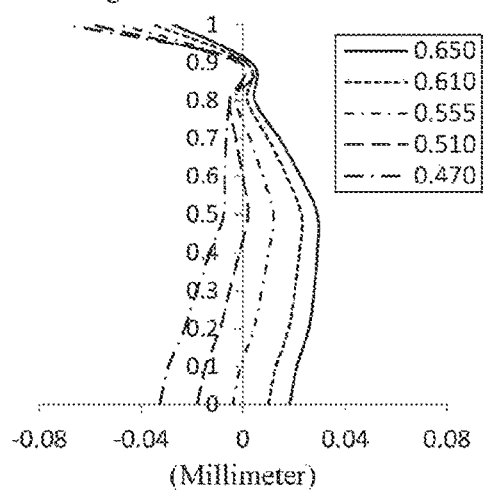
FIGS. 27 to 30 show a longitudinal aberration curve, an astigmatic curve, a distortion curve and a lateral color curve of the optical imaging lens assembly of Example 6.
Figure 28:
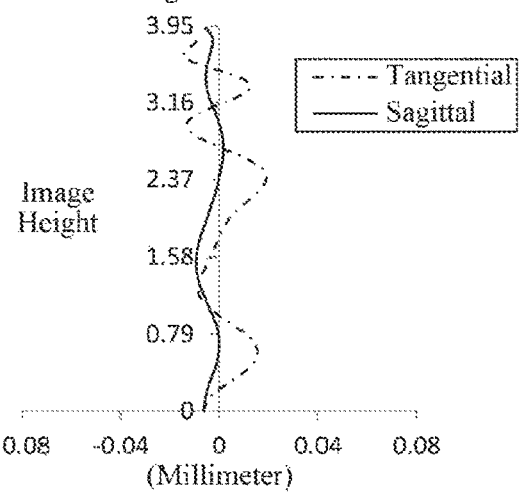
Figure 29:
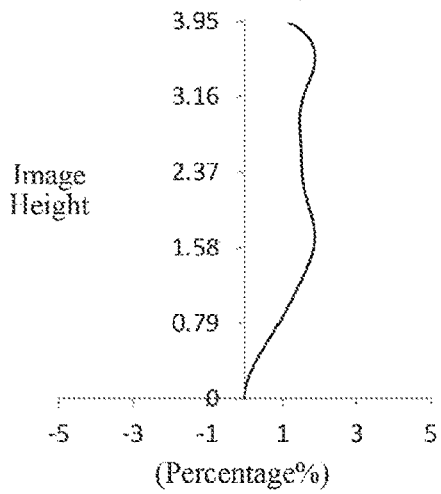
Figure 30:
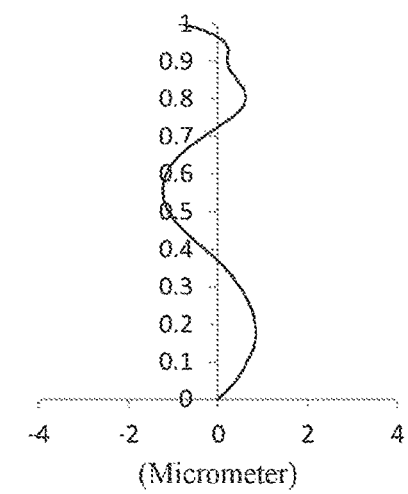

FIG. 27 illustrates a longitudinal aberration curve of the optical imaging system according to Example 6, representing deviations of focal points converged by light of different wavelengths after passing through the optical imaging system. FIG. 28 illustrates an astigmatic curve of the optical imaging system according to Example 6, representing a curvature of a tangential plane and a curvature of a sagittal plane. FIG. 29 illustrates a distortion curve of the optical imaging system according to Example 6, representing amounts of distortion corresponding to different FOVs. FIG. 30 illustrates a lateral color curve of the optical imaging system according to Example 6, representing deviations of different image heights on an image plane after light passes through the optical imaging system. It can be determined from the above description and FIGS. 27 to 30 that the optical imaging lens assembly according to Example 6 is applicable for portable electronic products, has an ultra-thin appearance and a large aperture, and has good imaging quality.

Example 7

An optical imaging lens assembly according to Example 7 of the disclosure is described below with reference to FIGS. 31 to 35.

Figure 31:
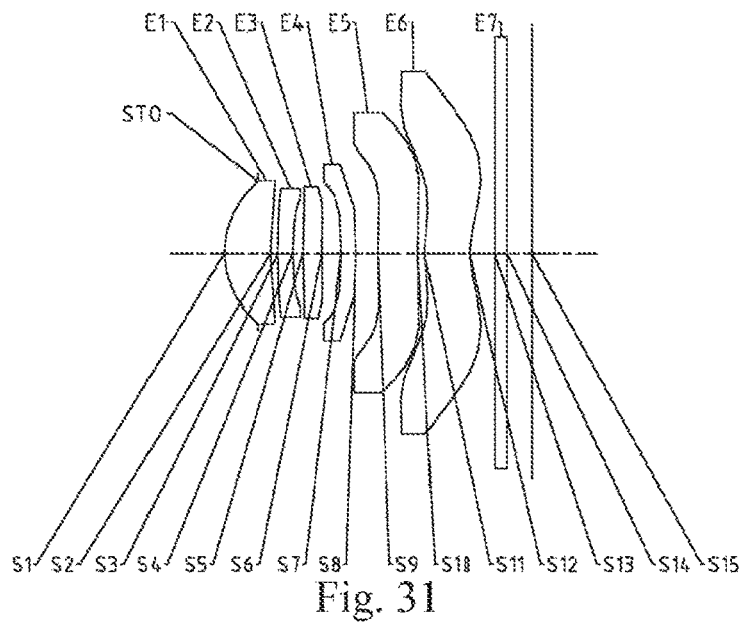
FIG. 31 shows a schematic structural diagram of an optical imaging lens assembly of Example 7.

FIG. 31 is a schematic structural diagram showing the optical imaging lens assembly of Example 7. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be concave.

The fourth lens E4 may have a negative refractive power. An object side surface S7 of the fourth lens E4 may be concave, and an image side surface S8 of the fourth lens E4 may be concave.

The fifth lens E5 may have a negative refractive power. An object side surface S9 of the fifth lens E5 may be concave, and an image side surface S10 of the fifth lens E5 may be concave.

The sixth lens E6 may have a negative refractive power. An object side surface S11 of the sixth lens E6 may be convex, and an image side surface S12 of the sixth lens E6 may be concave.

Table 19 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 19

| f1 (mm) | 4.14 | f (mm) | 4.55 |
| f2 (mm) | −11.87 | TTL (mm) | 5.30 |
| f3 (mm) | 19.06 | HFOV (°) | 40.4 |
| f4 (mm) | −215.66 | | |
| f5 (mm) | −800.32 | | |
| f6 (mm) | −11.68 | | |

Table 20 below shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 20

| Surface No. | Surface Type | Curvature Radius | Thickness | Refractive Index | Abbe Number | Conic Coefficient |
|---|---|---|---|---|---|---|
| OBJ | Spherical | Infinite | Infinite | | | |
| STO | Spherical | Infinite | −0.5748 | | | |
| S1 | Aspherical | 1.6132 | 0.7993 | 1.55 | 56.1 | 0.0081 |
| S2 | Aspherical | 4.6439 | 0.1311 | | | 0.0000 |
| S3 | Aspherical | 12.3109 | 0.2500 | 1.67 | 20.4 | −61.2814 |
| S4 | Aspherical | 4.7796 | 0.1791 | | | −3.1061 |
| S5 | Aspherical | 5.6326 | 0.3265 | 1.55 | 56.1 | 6.0540 |
| S6 | Aspherical | 12.0275 | 0.3309 | | | 11.5319 |
| S7 | Aspherical | −186.0666 | 0.2567 | 1.65 | 23.5 | −99.0000 |
| S8 | Aspherical | 550.0000 | 0.3855 | | | 99.0000 |
| S9 | Aspherical | −1091.7948 | 0.6832 | 1.67 | 20.4 | −99.0000 |
| S10 | Aspherical | 1044.5261 | 0.1124 | | | 99.0000 |
| S11 | Aspherical | 2.6308 | 0.7721 | 1.64 | 55.7 | −1.0564 |
| S12 | Aspherical | 1.6634 | 0.4357 | | | −1.0023 |
| S13 | Spherical | Infinite | 0.2100 | 1.52 | 64.2 | |
| S14 | Spherical | Infinite | 0.4304 | | | |
| S15 | Spherical | Infinite | | | | |

Table 21 below shows the high-order coefficients of each of the aspherical surfaces S1-S12 that can be used for respective aspherical lens in this example, where the shape of each of the aspherical surfaces may be defined by formula (1) given in Example 1 above.

TABLE 21

| Surface No. | A4 | A6 | A8 | A10 | A12 |
|---|---|---|---|---|---|
| S1 | −3.2438E−03 | 2.0826E−02 | −6.0114E−02 | 1.0464E−01 | −1.0345E−01 |
| S2 | −3.2742E−02 | 1.0523E−02 | −8.2761E−02 | 2.8686E−01 | −6.0252E−01 |
| S3 | −5.9275E−02 | 8.9399E−02 | −2.9255E−01 | 1.0810E+00 | −2.3905E+00 |
| S4 | −2.7625E−02 | 9.8160E−02 | −2.0094E−01 | 7.2330E−01 | −1.5809E+00 |
| S5 | −5.7000E−02 | 8.4159E−02 | −3.8156E−01 | 8.2282E−01 | −9.6236E−01 |
| S6 | −2.6777E−02 | −8.4994E−02 | 3.6619E−01 | −1.1126E+00 | 2.0290E+00 |
| S7 | −4.7187E−02 | −3.3570E−01 | 9.2045E−01 | −1.6384E+00 | 2.0013E+00 |
| S8 | 1.1199E−02 | −4.3097E−01 | 8.6773E−01 | −1.0860E+00 | 8.8402E−01 |
| S9 | 1.4871E−01 | −2.9537E−01 | 2.9854E−01 | −2.3436E−01 | 1.3185E−01 |
| S10 | 9.8026E−02 | −1.1275E−01 | 6.2612E−02 | −2.7175E−02 | 9.3224E−03 |

TABLE 21-continued

| | | | | |
|---|---|---|---|---|
| S11 | −1.8431E−01 | 7.6164E−02 | −3.5450E−02 | 1.3599E−02 | −3.2768E−03 |
| S12 | −2.0570E−01 | 1.0965E−01 | −5.1901E−02 | 1.7209E−02 | −3.7629E−03 |

| Surface No. | A14 | A16 | A18 | A20 |
|---|---|---|---|---|
| S1  | 5.1445E−02  | −6.8960E−03 | −3.7349E−03 | 9.6387E−04  |
| S2  | 7.6472E−01  | −5.7763E−01 | 2.3899E−01  | 4.1704E−02  |
| S3  | 3.1836E+00  | −2.5134E+00 | 1.0865E+00  | −1.9798E−01 |
| S4  | 2.1449E+00  | −1.7432E+00 | 7.7581E−01  | −1.3509E−01 |
| S5  | 2.7441E−01  | 6.4922E−01  | −7.6219E−01 | 2.6517E−01  |
| S6  | −2.3853E+00 | 1.7631E+00  | −7.5215E−01 | 1.4266E−01  |
| S7  | −1.6669E+00 | 9.1263E−01  | −2.9969E−01 | 4.4476E−02  |
| S8  | −4.4361E−01 | 1.3006E−01  | −2.0120E−02 | 1.2315E−03  |
| S9  | −4.8713E−02 | 1.1017E−02  | −1.3712E−03 | 7.1562E−05  |
| S10 | −2.2754E−03 | 3.5547E−04  | −3.1419E−05 | 1.1901E−06  |
| S11 | 4.7982E−04  | −4.1985E−05 | 2.0330E−06  | −4.2145E−08 |
| S12 | 5.2739E−04  | −4.5314E−05 | 2.1662E−06  | −4.4048E−08 |

Figures 32, 33:
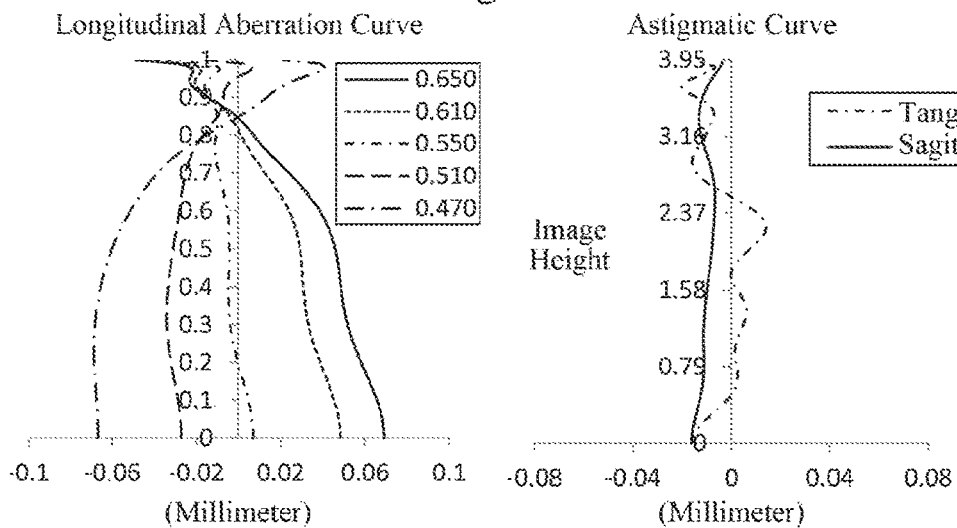
FIGS. 32 to 35 show a longitudinal aberration curve, an astigmatic curve, a distortion curve and a lateral color curve of the optical imaging lens assembly of Example 7, respectively.
Figures 34, 35:
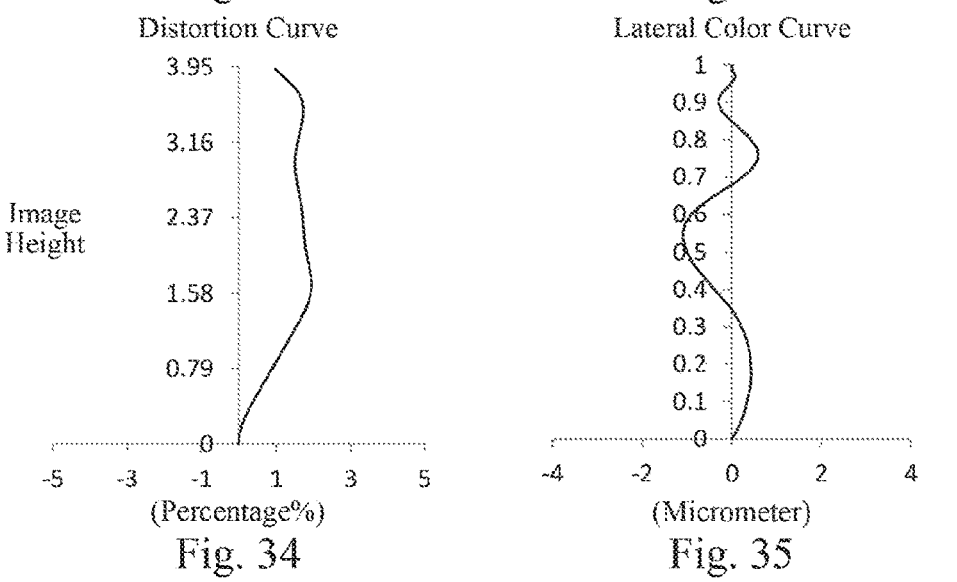

FIG. 32 illustrates a longitudinal aberration curve of the optical imaging system according to Example 7, representing deviations of focal points converged by light of different wavelengths after passing through the optical imaging system. FIG. 33 illustrates an astigmatic curve of the optical imaging system according to Example 7, representing a curvature of a tangential plane and a curvature of a sagittal plane. FIG. 34 illustrates a distortion curve of the optical imaging system according to Example 7, representing amounts of distortion corresponding to different FOVs. FIG. 35 illustrates a lateral color curve of the optical imaging system according to Example 7, representing deviations of different image heights on an image plane after light passes through the optical imaging system. It can be determined from the above description and FIGS. 32 to 35 that the optical imaging lens assembly according to Example 7 is applicable for portable electronic products, has an ultra-thin appearance and a large aperture, and has good imaging quality.

Example 8

An optical imaging lens assembly according to Example 8 of the disclosure is described below with reference to FIGS. 36 to 40.

Figure 36:
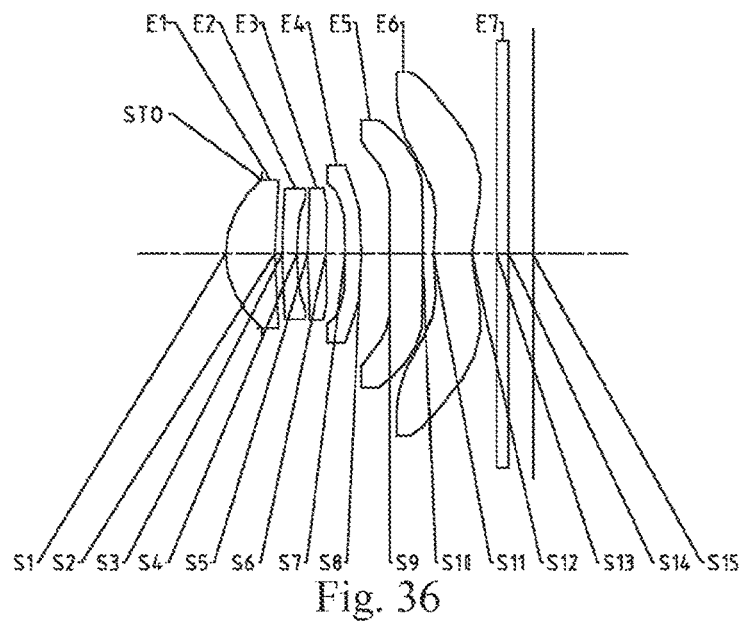
FIG. 36 shows a schematic structural diagram of an optical imaging lens assembly of Example 8.

FIG. 36 is a schematic structural diagram showing the optical imaging lens assembly of Example 8. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be concave.

The fourth lens E4 may have a positive refractive power. An object side surface S7 of the fourth lens E4 may be convex, and an image side surface S8 of the fourth lens E4 may be concave.

The fifth lens E5 may have a negative refractive power. An object side surface S9 of the fifth lens E5 may be concave, and an image side surface S10 of the fifth lens E5 may be concave.

The sixth lens E6 may have a negative refractive power. An object side surface S11 of the sixth lens E6 may be convex, and an image side surface S12 of the sixth lens E6 may be concave.

Table 22 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 22

| f1 (mm) | 3.97    | f (mm)   | 4.90 |
|---------|---------|----------|------|
| f2 (mm) | −10.07  | TTL (mm) | 5.30 |
| f3 (mm) | 23.17   | HFOV (°) | 38.4 |
| f4 (mm) | 6907.61 |          |      |
| f5 (mm) | −799.96 |          |      |
| f6 (mm) | −8.28   |          |      |

The following Table 23 shows the surface type, curvature radius, thickness, refractive index, abbe number and conic coefficient of each of the lenses in the optical imaging lens assembly of this example, wherein both the curvature radius and the thickness are expressed in millimeters (mm).

TABLE 23

| | | | | Material | | |
|---|---|---|---|---|---|---|
| Surface No. | Surface Type | Curvature Radius | Thickness | Refractive Index | Abbe Number | Conic Coefficient |
| OBJ | Spherical  | Infinite   | Infinite |      |      |           |
| STO | Spherical  | Infinite   | −0.6095  |      |      |           |
| S1  | Aspherical | 1.5926     | 0.8458   | 1.55 | 56.1 | 0.0141    |
| S2  | Aspherical | 4.8910     | 0.1361   |      |      | 0.0000    |
| S3  | Aspherical | 14.5993    | 0.2500   | 1.67 | 20.4 | −69.4956  |
| S4  | Aspherical | 4.5670     | 0.1868   |      |      | −2.9025   |
| S5  | Aspherical | 5.0801     | 0.3100   | 1.55 | 56.1 | 4.2878    |
| S6  | Aspherical | 8.3078     | 0.3372   |      |      | 1.0947    |
| S7  | Aspherical | 449.6183   | 0.2768   | 1.65 | 23.5 | 99.0000   |
| S8  | Aspherical | 500.0000   | 0.4942   |      |      | 99.0000   |
| S9  | Aspherical | −1621.8226 | 0.5661   | 1.67 | 20.4 | −98.9996  |
| S10 | Aspherical | 795.1617   | 0.1779   |      |      | −99.0000  |
| S11 | Aspherical | 2.8450     | 0.6647   | 1.64 | 55.7 | −0.9783   |
| S12 | Aspherical | 1.5933     | 0.4263   |      |      | −1.0037   |
| S13 | Spherical  | Infinite   | 0.2100   | 1.52 | 64.2 |           |
| S14 | Spherical  | Infinite   | 0.4210   |      |      |           |
| S15 | Spherical  | Infinite   |          |      |      |           |

Table 24 below shows the high-order coefficients of the aspherical surfaces S1-S12 that can be used for respective aspherical lenses in this embodiment, wherein the shape of each of the aspherical surfaces may be defined by formula (1) given in Example 1 above.

TABLE 24

| Surface No. | A4 | A6 | A8 | A10 | A12 |
|---|---|---|---|---|---|
| S1 | 2.2309E−03 | −1.6943E−02 | 7.1951E−02 | −1.8458E−01 | 2.9568E−01 |
| S2 | −3.3377E−02 | 1.5683E−02 | −9.1109E−02 | 2.6516E−01 | −4.9601E−01 |
| S3 | −5.5499E−02 | 5.0121E−02 | −5.5728E−02 | 2.4456E−01 | −6.4020E−01 |
| S4 | −2.9240E−02 | 1.1883E−01 | −2.7628E−01 | 8.3712E−01 | −1.5677E+00 |
| S5 | −4.8712E−02 | −3.0931E−02 | 1.5783E−01 | −6.7750E−01 | 1.6167E+00 |
| S6 | −4.2411E−02 | −8.3271E−03 | 5.4335E−02 | −3.5478E−01 | 9.0995E−01 |
| S7 | −3.4651E−02 | −5.5043E−01 | 2.0625E+00 | 4.9801E+00 | 7.7460E+00 |
| S8 | −6.7913E−03 | −3.7852E−01 | 8.5278E−01 | −1.2047E+00 | 1.0860E+00 |
| S9 | 1.3945E−01 | −2.9658E−01 | 3.4347E−01 | −3.0239E−01 | 1.7611E−01 |
| S10 | 6.1062E−02 | −8.5415E−02 | 6.3914E−02 | −4.4658E−02 | 2.1502E−02 |
| S11 | −2.6708E−01 | 1.4398E−01 | −6.7888E−02 | 2.3894E−02 | −5.4365E−03 |
| S12 | −2.7445E−01 | 1.7571E−01 | −9.4854E−02 | 3.5030E−02 | −8.3561E−03 |

| Surface No. | A14 | A16 | A18 | A20 |
|---|---|---|---|---|
| S1 | −2.9503E−01 | 1.7613E−01 | −5.7378E−02 | 7.6668E−03 |
| S2 | 5.8082E−01 | −4.1119E−01 | 1.6059E−01 | −2.6535E−02 |
| S3 | 9.5468E−01 | −8.1056E−01 | 3.6844E−01 | −6.9415E−02 |
| S4 | 1.7855E+00 | −1.1168E+00 | 2.9715E−01 | 9.0688E−03 |
| S5 | −2.4737E+00 | 2.3945E+00 | −1.3555E+00 | 3.4652E−01 |
| S6 | −1.3935E+00 | 1.2723E+00 | −6.4375E−01 | 1.4007E−01 |
| S7 | −7.7174E+00 | 4.7711E+00 | −1.6721E+00 | 2.5344E−01 |
| S8 | −5.9650E−01 | 1.9216E−01 | −3.3276E−02 | 2.3751E−03 |
| S9 | −6.3712E−02 | 1.3727E−02 | −1.6093E−03 | 7.8838E−05 |
| S10 | −6.3226E−03 | 1.0945E−03 | −1.0330E−04 | 4.1243E−06 |
| S11 | 7.7328E−04 | −6.6889E−05 | 3.2432E−06 | −6.8172E−08 |
| S12 | 1.2573E−03 | −1.1480E−04 | 5.7968E−06 | −1.2408E−07 |

Figure 37:
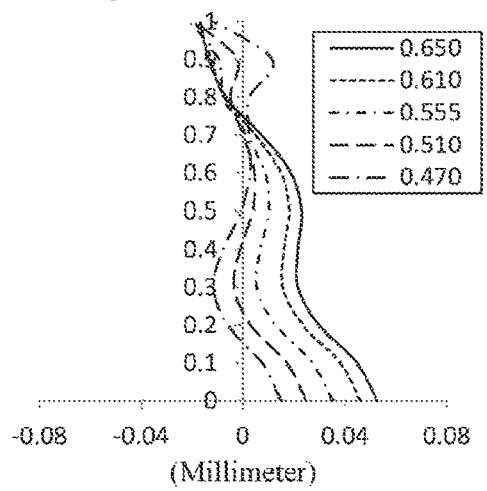
FIGS. 37 to 40 show a longitudinal aberration curve, an astigmatic curve, a distortion curve and a lateral color curve of the optical imaging lens assembly of Example 8, respectively.
Figure 38:
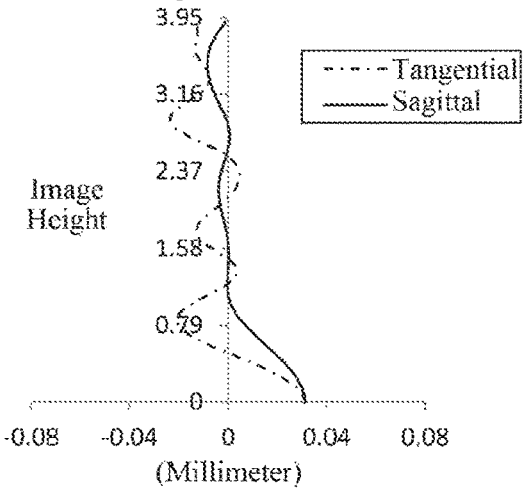
Figure 39:
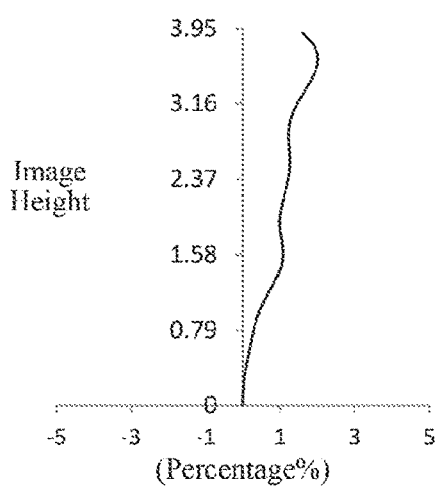
Figure 40:
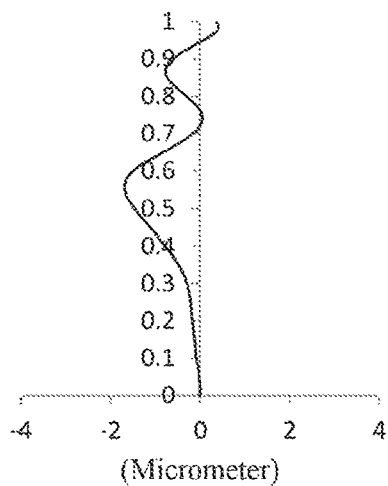

FIG. 37 illustrates a longitudinal aberration curve of the optical imaging system according to Example 8, representing deviations of focal points converged by light of different wavelengths after passing through the optical imaging system. FIG. 38 illustrates an astigmatic curve of the optical imaging system according to Example 8, representing a curvature of a tangential plane and a curvature of a sagittal plane. FIG. 39 illustrates a distortion curve of the optical imaging system according to Example 8, representing amounts of distortion corresponding to different FOVs. FIG. 40 illustrates a lateral color curve of the optical imaging system according to Example 8, representing deviations of different image heights on an image plane after light passes through the optical imaging system. It can be determined from the above description and FIGS. 37 to 40 that the optical imaging lens assembly according to Example 8 is applicable for portable electronic products, has an ultra-thin appearance and a large aperture, and has good imaging quality.

Example 9

An optical imaging lens assembly according to Example 9 of the disclosure is described below with reference to FIGS. 41 to 45.

FIG. 41 is a schematic structural diagram showing the optical imaging lens assembly of Example 9. The optical imaging lens assembly sequentially includes a first lens E1, a second lens E2, a third lens E3, a fourth lens E4, a fifth lens E5, and a sixth lens E6 from an object side to an image side.

The first lens E1 may have a positive refractive power. An object side surface S1 of the first lens E1 may be convex and an image side surface S2 of the first lens E1 is concave.

The second lens E2 may have a negative refractive power. An object side surface S3 of the second lens E2 may be convex and an image side surface S4 of the second lens E2 may be concave.

The third lens E3 may have a positive refractive power. An object side surface S5 of the third lens E3 may be convex, and an image side surface S6 of the third lens E3 may be concave.

The fourth lens E4 may have a negative refractive power. An object side surface S7 of the fourth lens E4 may be concave, and an image side surface S8 of the fourth lens E4 may be concave.

The fifth lens E5 may have a negative refractive power. An object side surface S9 of the fifth lens E5 may be concave, and an image side surface S10 of the fifth lens E5 may be convex.

The sixth lens E6 may have a negative refractive power. An object side surface S11 of the sixth lens E6 may be convex, and an image side surface S12 of the sixth lens E6 may be concave.

Table 25 below shows effective focal length f1 to f6 of the first lens E1 to the sixth lens E6, a total effective focal length f of the optical imaging lens assembly, a total length TTL of the optical imaging lens assembly, and half of a maximum field of view HFOV (°) of the optical imaging lens assembly.

TABLE 25

| f1 (mm) | 3.96 | f (mm) | 4.90 |
|---|---|---|---|
| f2 (mm) | −10.38 | TTL (mm) | 5.33 |

TABLE 25-continued

| f3 (mm) | 24.11 | HFOV (°) | 38.6 |
|---|---|---|---|
| f4 (mm) | −281.59 | | |
| f5 (mm) | −2779.24 | | |
| f6 (mm) | −8.49 | | |

Table 26 below shows the surface type, curvature radius, thickness, refractive index, abbe number, and conic coefficient of each lens in the optical imaging lens assembly of this embodiment, wherein both the curvature radius and thickness are expressed in millimeters (mm).

TABLE 26

| Surface No. | Surface Type | Curvature Radius | Thickness | Material Refractive Index | Abbe Number | Conic Coefficient |
|---|---|---|---|---|---|---|
| OBJ | Spherical | Infinite | Infinite | | | |
| STO | Spherical | Infinite | −0.6153 | | | |
| S1 | Aspherical | 1.5947 | 0.8499 | 1.55 | 56.1 | 0.0187 |
| S2 | Aspherical | 4.9253 | 0.1328 | | | 0.0000 |
| S3 | Aspherical | 15.5668 | 0.2500 | 1.67 | 20.4 | −72.8314 |
| S4 | Aspherical | 4.7611 | 0.1956 | | | −2.1326 |
| S5 | Aspherical | 5.7276 | 0.3160 | 1.55 | 56.1 | 5.4689 |
| S6 | Aspherical | 9.9446 | 0.3364 | | | −3.9904 |
| S7 | Aspherical | −285.0071 | 0.2729 | 1.65 | 23.5 | −99.0000 |
| S8 | Aspherical | 500.0000 | 0.4948 | | | 99.0000 |
| S9 | Aspherical | −873.6169 | 0.5744 | 1.67 | 20.4 | −98.9996 |
| S10 | Aspherical | −1652.9011 | 0.1695 | | | 99.0000 |
| S11 | Aspherical | 2.8422 | 0.6774 | 1.64 | 55.7 | −0.9822 |
| S12 | Aspherical | 1.6045 | 0.4290 | | | −1.0000 |
| S13 | Spherical | Infinite | 0.2100 | 1.52 | 64.2 | |
| S14 | Spherical | Infinite | 0.4237 | | | |
| S15 | Spherical | Infinite | | | | |

Table 27 below shows the high-order coefficients of each of the aspherical surfaces S1-S12 that can be used for respective aspherical lenses in this embodiment, wherein the shape of each of the aspherical surfaces may be defined by formula (1) given in Example 1 above.

TABLE 27

| Surface No. | A4 | A6 | A8 | A10 | A12 |
|---|---|---|---|---|---|
| S1 | 2.2748E−03 | −1.7378E−02 | 7.5126E−02 | −1.9107E−01 | 3.0098E−01 |
| S2 | −3.2845E−02 | 1.3802E−02 | −9.4375E−02 | 2.8391E−01 | −5.2545E−01 |
| S3 | −5.4105E−02 | 4.7681E−02 | −7.2269E−02 | 3.1815E−01 | −7.7120E−01 |
| S4 | −2.3937E−02 | 8.5681E−02 | −1.0079E−01 | 1.6999E−01 | 9.6151E−02 |
| S5 | −4.9375E−02 | −8.2225E−03 | 2.7759E−02 | −3.0181E−01 | 1.0177E+00 |
| S6 | −3.4744E−02 | −8.1843E−02 | 3.9403E−01 | −1.3324E+00 | 2.6817E+00 |
| S7 | −2.3015E−02 | −5.7182E−01 | 1.9680E+00 | −4.4389E+00 | 6.5405E+00 |
| S8 | 7.0218E−04 | −3.8887E−01 | 8.4163E−01 | −1.1448E+00 | 1.0033E+00 |
| S9 | 1.3615E−01 | −2.8454E−01 | 3.2571E−01 | −2.8242E−01 | 1.6274E−01 |
| S10 | 6.0902E−02 | −9.5616E−02 | 8.1990E−02 | −5.9242E−02 | 2.8290E−02 |
| S11 | −2.6895E−01 | 1.4718E−01 | −7.1647E−02 | 2.5933E−02 | −6.0115E−03 |
| S12 | −2.6931E−01 | 1.6946E−01 | −8.9013E−02 | 3.1964E−02 | −7.4146E−03 |

| Surface No. | A14 | A16 | A18 | A20 |
|---|---|---|---|---|
| S1 | −2.9438E−01 | 1.7222E−01 | −5.4929E−02 | 7.1684E−03 |
| S2 | 6.0520E−01 | 4.2217E−01 | 1.6279E−01 | −2.6593E−02 |
| S3 | 1.0839E+00 | −8.8517E−01 | 3.9171E−01 | −7.2351E−02 |
| S4 | −8.1711E−01 | 1.3434E+00 | −9.8929E−01 | 2.9465E−01 |
| S5 | −1.9694E+00 | 2.2459E+00 | −1.4134E+00 | 3.8201E−01 |
| S6 | −3.4080E+00 | 2.6646E+00 | −1.1752E+00 | 2.2515E−01 |
| S7 | −6.2333E+00 | 3.7074E+00 | −1.2536E+00 | 1.8334E−01 |
| S8 | −5.4036E−01 | 1.7158E−01 | −2.9383E−02 | 2.0789E−03 |
| S9 | −5.8427E−02 | 1.2492E−02 | −1.4513E−03 | 7.0363E−05 |
| S10 | −8.2537E−03 | 1.4272E−03 | −1.3527E−04 | 5.4422E−06 |
| S11 | 8.6407E−04 | −7.4951E−05 | 3.6157E−06 | −7.4998E−08 |
| S12 | 1.0856E−03 | −9.6525E−05 | 4.7503E−06 | −9.9168E−08 |

FIG. 42 illustrates a longitudinal aberration curve of the optical imaging system according to Example 9, representing deviations of focal points converged by light of different wavelengths after passing through the optical imaging system. FIG. 43 illustrates an astigmatic curve of the optical imaging system according to Example 9, representing a curvature of a tangential plane and a curvature of a sagittal plane. FIG. 44 illustrates a distortion curve of the optical imaging system according to Example 9, representing amounts of distortion corresponding to different FOVs. FIG. 45 illustrates a lateral color curve of the optical imaging system according to Example 9, representing deviations of different image heights on an image plane after light passes through the optical imaging system. It can be determined from the above description and FIGS. 42 to 45 that the optical imaging lens assembly according to Example 9 is applicable for portable electronic products, has an ultra-thin appearance and a large aperture, and has good imaging quality.

In summary, various conditional in Examples 1 to 9 above have values listed in Table 28 below.

TABLE 28

| Conditional/Example | 1 | 2 | 3 | 4 | 5 | 6 | 7 | 8 | 9 |
|---|---|---|---|---|---|---|---|---|---|
| f/EPD | 1.83 | 1.84 | 1.79 | 1.81 | 1.82 | 1.82 | 1.81 | 1.91 | 1.91 |
| R9/R10 | 0.53 | 0.53 | 0.53 | 0.53 | −0.12 | 0.53 | −1.05 | −2.04 | 0.53 |
| f*TAN(HFOV) | 3.88 | 3.88 | 3.87 | 3.87 | 3.87 | 3.87 | 3.87 | 3.89 | 3.92 |
| f6/f1 | −2.05 | −2.17 | −2.08 | −2.07 | −2.98 | −2.72 | −2.82 | −2.09 | −2.14 |
| TTL/ImgH | 1.35 | 1.35 | 1.34 | 1.35 | 1.35 | 1.35 | 1.35 | 1.36 | 1.35 |
| f2/f | −2.93 | −2.70 | −3.52 | −3.38 | −3.13 | −3.45 | −2.61 | −2.05 | −2.12 |
| (R1 + R2)/(R3 + R4) | 0.27 | 0.26 | 0.21 | 0.24 | 0.26 | 0.24 | 0.37 | 0.34 | 0.32 |
| f/(R11 + R12) | 0.89 | 0.89 | 0.86 | 0.85 | 0.92 | 0.90 | 1.06 | 1.10 | 1.10 |
| CT4/CT5 | 0.43 | 0.43 | 0.38 | 0.41 | 0.46 | 0.53 | 0.38 | 0.49 | 0.48 |
| f1/f | 0.87 | 0.84 | 0.87 | 0.87 | 0.86 | 0.86 | 0.91 | 0.81 | 0.81 |
| T23/CT3 | 0.73 | 0.79 | 0.81 | 0.81 | 0.79 | 0.85 | 0.55 | 0.60 | 0.62 |
| (CT1 + CT2 + CT6)/CT1 | 2.23 | 2.14 | 2.23 | 2.26 | 2.35 | 2.29 | 2.28 | 2.08 | 2.09 |
| Σ CT/TTL | 0.58 | 0.57 | 0.58 | 0.58 | 0.58 | 0.58 | 0.58 | 0.55 | 0.55 |
| ET5/CT5 | 0.74 | 0.76 | 0.70 | 0.69 | 0.73 | 0.72 | 0.71 | 0.54 | 0.52 |
| SAG41/CT4 | −0.28 | −0.30 | −0.35 | −0.33 | −0.33 | −0.36 | −0.44 | −0.54 | −0.57 |
| T56/T45 | 0.25 | 0.22 | 0.34 | 0.30 | 0.13 | 0.28 | 0.29 | 0.36 | 0.34 |

The foregoing is only a description of the preferred examples of the disclosure and the applied technical principles. It should be appreciated by those skilled in the art that the scope of the invention involved in the disclosure is not limited to the technical solutions formed by the particular combinations of the above technical features. The scope of the invention should also cover other technical solutions obtained by any combinations of the above technical features or equivalent features thereof without departing from the concept of the invention, such as, technical solutions formed by replacing the features as disclosed in the disclosure with (but not limited to), technical features with similar functions.

What is claimed is:

1. An optical imaging lens assembly comprising, sequentially from an object side to an image side of the optical imaging lens assembly, a first lens, a second lens, a third lens, a fourth lens, a fifth lens, and a sixth lens, wherein:
   the first lens has a positive refractive power with a convex object side surface and a concave image side surface;
   the second lens has a negative refractive power with a convex object side surface and a concave image side surface;
   the third lens has a refractive power;
   the fourth lens has a refractive power with a concave image side surface;
   the fifth lens has a refractive power;
   the sixth lens has a negative refractive power with a convex object side surface and a concave image side surface;
   an effective focal length f of the optical imaging lens assembly and an entrance pupil diameter EPD of the optical imaging lens assembly satisfy f/EPD<2.0,
   the effective focal length f of the optical imaging lens assembly and half of a maximum field of view HFOV of the optical imaging lens assembly satisfy 3.8 mm<f*TAN(HFOV)<5 mm,
   a curvature radius R8 of the image side surface of the fourth lens satisfies R8≥500 mm, and
   a curvature radius R1 of the object side surface of the first lens, a curvature radius R2 of the image side surface of the first lens, a curvature radius R3 of the object side surface of the second lens, and a curvature radius R4 of the image side surface of the second lens satisfy 0.2≤(R1+R2)/(R3+R4)<0.5.

2. The optical imaging lens assembly according to claim 1, wherein a distance TTL along an optical axis from the object side surface of the first lens to an imaging surface and half of a diagonal length ImgH of an effective pixel region on the imaging surface satisfy TTL/ImgH<1.5.

3. The optical imaging lens assembly according to claim 1, wherein an effective focal length f2 of the second lens and the effective focal length f of the optical imaging lens assembly satisfy −4<f2/f<−2.5.

4. The optical imaging lens assembly according to claim 1, wherein the effective focal length f of the optical imaging lens assembly, a curvature radius R11 of the object side surface of the sixth lens, and a curvature radius R12 of the image side surface of the sixth lens satisfy 0.7<f/(R11+R12)<1.3.

5. The optical imaging lens assembly according to claim 1, wherein a central thickness CT4 of the fourth lens along an optical axis and a central thickness CT5 of the fifth lens along the optical axis satisfy 0.3 CT4/CT5<1.0.

6. The optical imaging lens assembly according to claim 1, wherein a space interval T23 between the second lens and the third lens along an optical axis and a central thickness CT3 of the third lens satisfy 0.5≤T23/CT3<0.9.

7. The optical imaging lens assembly according to claim 1, wherein a central thickness CT1 of the first lens, a central thickness CT2 of the second lens, and a central thickness CT6 of the sixth lens satisfy 2<(CT1+CT2+CT6)/CT1<3.

8. The optical imaging lens assembly according to claim 1, wherein a distance TTL along an optical axis from the object side surface of the first lens to an imaging surface and a sum of central thicknesses $\Sigma CT$ along the optical axis from the first lens to the sixth lens satisfy $0.5 \leq \Sigma CT/TTL < 0.7$.

9. The optical imaging lens assembly according to claim 1, wherein a space interval T56 between the fifth lens and the sixth lens along an optical axis and a space interval T45 between the fourth lens and the fifth lens along the optical axis satisfy $T56/T45 \leq 0.4$.

10. An optical imaging lens assembly comprising, sequentially from an object side to an image side of the optical imaging lens assembly, a first lens, a second lens, a third lens, a fourth lens, a fifth lens, and a sixth lens, wherein:
   the first lens has a positive refractive power with a convex object side surface and a concave image side surface;
   the second lens has a negative refractive power with a convex object side surface and a concave image side surface;
   the third lens has a refractive power;
   the fourth lens has a refractive power with a concave image side surface;
   the fifth lens has a refractive power;
   the sixth lens has a negative refractive power with a convex object side surface and a concave image side surface;
   a curvature radius R9 of an object side surface of the fifth lens and a curvature radius R10 of an image side surface of the fifth lens satisfy $-3.5 < R9/R10 < 0.6$; and
   a curvature radius R1 of the object side surface of the first lens, a curvature radius R2 of the image side surface of the first lens, a curvature radius R3 of the object side surface of the second lens, and a curvature radius R4 of the image side surface of the second lens satisfy $0.2 \leq (R1+R2)/(R3+R4) < 0.5$.

11. The optical imaging lens assembly according to claim 10, wherein an effective focal length f1 of the first lens and an effective focal length f6 of the sixth lens satisfy $-3.5 < f6/f1 < -2.5$.

12. The optical imaging lens assembly according to claim 10, wherein the effective focal length f2 of the second lens and an effective focal length f of the optical imaging lens assembly satisfy $-4 < f2/f < -2.5$.

13. The optical imaging lens assembly according to claim 10, wherein an edge thickness ET5 of the fifth lens and a central thickness CT5 of the fifth lens along an optical axis satisfy $0.5 \leq ET5/CT5 < 0.8$.

14. The optical imaging lens assembly according to claim 10, wherein a distance SAG41 along an optical axis from an intersection of an object side surface of the fourth lens and the optical axis to a vertex of an effective radius of the object side surface of the fourth lens and a central thickness CT4 of the fourth lens along the optical axis satisfy $-0.6 \leq SAG41/CT4 \leq -0.2$.

15. An optical imaging lens assembly comprising, sequentially from an object side to an image side of the optical imaging lens assembly, a first lens, a second lens, a third lens, a fourth lens, a fifth lens, and a sixth lens, wherein:
   the first lens has a positive refractive power with a convex object side surface and a concave image side surface;
   the second lens has a negative refractive power with a convex object side surface and a concave image side surface;
   the third lens has a refractive power;
   the fourth lens has a refractive power with a concave image side surface;
   the fifth lens has a refractive power;
   the sixth lens has a negative refractive power with a convex object side surface and a concave image side surface; and
   an effective focal length f1 of the first lens and an effective focal length f of the optical imaging lens assembly satisfy $0.7 < f1/f < 1$,
   the effective focal length f of the optical imaging lens assembly and half of a maximum field of view HFOV of the optical imaging lens assembly satisfy 3.8 mm $< f*TAN(HFOV) < 5$ mm, and
   a curvature radius R1 of the object side surface of the first lens, a curvature radius R2 of the image side surface of the first lens, a curvature radius R3 of the object side surface of the second lens, and a curvature radius R4 of the image side surface of the second lens satisfy $0.2 \leq (R1+R2)/(R3+R4) < 0.5$.

16. The optical imaging lens assembly according to claim 15, wherein the effective focal length f1 of the first lens and an effective focal length f6 of the sixth lens satisfy $-3.5 < f6/f1 < -2.5$.

17. The optical imaging lens assembly according to claim 15, wherein a curvature radius R8 of the image side surface of the fourth lens satisfies $R8 \geq 500$ mm.

* * * * *